(12) United States Patent
Wei et al.

(10) Patent No.: US 12,359,485 B2
(45) Date of Patent: Jul. 15, 2025

(54) DAMPING ASSEMBLY, ROTATING MECHANISM, AND FOLDABLE TERMINAL

(71) Applicant: HONOR DEVICE CO., LTD., Guangdong (CN)

(72) Inventors: Yameng Wei, Shenzhen (CN); Lei Feng, Shenzhen (CN); Wenxing Yao, Shenzhen (CN); Wei Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/246,778

(22) PCT Filed: Sep. 5, 2022

(86) PCT No.: PCT/CN2022/117105
§ 371 (c)(1),
(2) Date: Mar. 27, 2023

(87) PCT Pub. No.: WO2023/036088
PCT Pub. Date: Mar. 16, 2023

(65) Prior Publication Data
US 2023/0358089 A1    Nov. 9, 2023

(30) Foreign Application Priority Data
Sep. 8, 2021    (CN) .......................... 202111047947.4

(51) Int. Cl.
*E05D 11/08*    (2006.01)
*E05D 3/18*    (2006.01)
(Continued)

(52) U.S. Cl.
CPC .................. *E05F 3/20* (2013.01); *E05D 3/18* (2013.01); *H04M 1/0216* (2013.01); *H04M 1/0268* (2013.01); *E05Y 2999/00* (2024.05)

(58) Field of Classification Search
CPC ........ G06F 1/1681; G06F 1/1616; E05F 3/20; E05Y 2900/606; E05Y 2201/26;
(Continued)

(56) References Cited

U.S. PATENT DOCUMENTS 5,752,293 A * 5/1998 Lowry .................. G06F 1/1616
16/337
5,771,539 A * 6/1998 Wahlstedt ............... F16D 7/022
16/342

(Continued)

FOREIGN PATENT DOCUMENTS

CN    201044391 Y    4/2008
CN    202220793 U    5/2012
(Continued)

*Primary Examiner* — Chuck Y Mah

(57) ABSTRACT

Embodiments of this application provide a damping assembly, a rotating mechanism, and a foldable terminal. The damping assembly has a simple structure and occupies a relatively small space, which is conductive to a lightening and thinning design of a foldable terminal. The damping assembly includes a damping section and a shaft sleeve sleeved onto the damping part, where the damping section includes a first damping part and a second damping part, and the shaft sleeve includes a first shaft sleeve part and a second shaft sleeve part an interference amount between the first shaft sleeve part and the first damping part is a first interference amount; an interference amount between the second shaft sleeve part and the second damping part is a second interference amount, and the second interference amount is less than the first interference amount.

20 Claims, 12 Drawing Sheets

(51) Int. Cl.
*E05F 3/20* (2006.01)
*H04M 1/02* (2006.01)

(58) Field of Classification Search
CPC .......... E05Y 2999/00; H04M 1/0216; H04M 1/0268; E05D 11/08; E05D 11/082; E05D 11/084; E05D 11/085; E05D 3/02; E05D 3/18; E05D 5/14; E05D 2005/145; F16C 11/04

See application file for complete search history.

(56) References Cited

U.S. PATENT DOCUMENTS

| | | | | |
|---|---|---|---|---|
| 5,943,738 | A * | 8/1999 | Karfiol | E05D 11/082 |
| | | | | 16/342 |
| 6,464,052 | B1 | 10/2002 | Hsiao | |
| 6,804,862 | B2 * | 10/2004 | Miller | E05D 5/10 |
| | | | | 16/386 |
| 7,836,552 | B2 * | 11/2010 | Chao | G06F 1/1616 |
| | | | | 16/337 |
| 10,324,500 | B2 * | 6/2019 | Schafer | G06F 1/1681 |
| 10,450,893 | B1 | 10/2019 | Polly et al. | |
| 10,931,070 | B1 * | 2/2021 | Files | H01R 9/0524 |
| 11,408,216 | B2 * | 8/2022 | Gunner | B33Y 80/00 |
| 2002/0112319 | A1 * | 8/2002 | Kida | G06F 1/1616 |
| | | | | 16/342 |
| 2007/0090249 | A1 | 4/2007 | Lu et al. | |
| 2007/0186382 | A1 * | 8/2007 | Huang | G06F 1/1616 |
| | | | | 16/293 |
| 2009/0165248 | A1 * | 7/2009 | Wang | E05D 11/082 |
| | | | | 16/339 |
| 2010/0064475 | A1 * | 3/2010 | Wang | G06F 1/1681 |
| | | | | 16/337 |
| 2010/0139042 | A1 * | 6/2010 | Chang | G06F 1/1681 |
| | | | | 16/297 |
| 2011/0146028 | A1 * | 6/2011 | Lee | G06F 1/1681 |
| | | | | 16/382 |
| 2013/0146110 | A1 | 6/2013 | Heim et al. | |
| 2016/0216744 | A1 * | 7/2016 | Yang | G06F 1/1681 |
| 2018/0029215 | A1 | 2/2018 | Zhong et al. | |
| 2020/0371561 | A1 * | 11/2020 | Lin | E05D 3/18 |
| 2021/0081007 | A1 * | 3/2021 | Jan | G06F 1/1681 |
| 2021/0208639 | A1 * | 7/2021 | Sanchez | E05D 11/08 |
| 2022/0061174 | A1 | 2/2022 | Xie et al. | |

FOREIGN PATENT DOCUMENTS

| | | | |
|---|---|---|---|
| CN | 107327471 | A | 11/2017 |
| CN | 206972745 | U | 2/2018 |
| CN | 108716327 | A | 10/2018 |
| CN | 109026982 | A | 12/2018 |
| CN | 110005694 | A | 7/2019 |
| CN | 110805610 | A | 2/2020 |
| CN | 110816423 | A | 2/2020 |
| CN | 213023255 | U | 4/2021 |
| CN | 112780721 | A | 5/2021 |
| CN | 112911033 | A | 6/2021 |
| CN | 112947692 | A | 6/2021 |
| CN | 114992223 | A | 9/2022 |
| DE | 2456262 | A1 * | 6/1996 |
| JP | 06159347 | A * | 6/1994 |
| JP | 2002364692 | A | 12/2002 |
| JP | 2006177455 | A | 7/2006 |
| JP | 2008106852 | A | 5/2008 |

* cited by examiner

DAMPING ASSEMBLY, ROTATING MECHANISM, AND FOLDABLE TERMINAL

This application is a National Stage of International Application No. PCT/CN2022/117105, filed on Sep. 5, 2022, which claims priority to Chinese Patent Application No. 202111047947.4, filed on Sep. 8, 2021, both of which are hereby incorporated by reference in their entireties.

TECHNICAL FIELD

This application relates to the field of foldable terminals, and in particular, to a damping assembly, a rotating mechanism, and a foldable terminal.

BACKGROUND

With the progress of science and technology, the era of large-screen intelligent terminals is coming, and foldable terminals are favored by users because of their advantages such as large screen and portability. Currently, a foldable terminal usually uses a rotating mechanism including a damping assembly to implement folding and unfolding, so as to optimize a damping handfeel of a user during folding and unfolding of the foldable terminal. However, existing damping assemblies are complex in structure, and usually need to occupy a relatively large space, which is not conducive to a lightening and thinning design of the foldable terminals.

SUMMARY

This application provides a damping assembly, a rotating mechanism, and a foldable terminal. The damping assembly has a simple structure and occupies a relatively small space, which is conductive to a lightening and thinning design of a foldable terminal.

According to a first aspect, this application provides a damping assembly, including a damping section and a shaft sleeve sleeved onto the damping section. The damping section includes first damping parts and second damping parts that are arranged in an axial direction of the damping section. The shaft sleeve includes first shaft sleeve parts and second shaft sleeve parts that are arranged in an axial direction of the shaft sleeve. The first shaft sleeve parts are sleeved onto the first damping parts, and an interference amount between the first shaft sleeve part and the first damping part is a first interference amount. The second shaft sleeve parts are sleeved onto the second damping parts, and an interference amount between the second shaft sleeve part and the second damping part is a second interference amount. The second interference amount is less than the first interference amount.

The axial direction of the damping section is the same as that of the shaft sleeve.

The first interference amount is a difference between a diameter of the first damping part and an inner diameter of the first shaft sleeve part. That is, the first interference amount is equal to the diameter of the first damping part minus the inner diameter of the first shaft sleeve part. The second interference amount is a difference between a diameter of the second damping part and an inner diameter of the second shaft sleeve part. That is, the second interference amount is equal to the diameter of the second damping part minus the inner diameter of the second shaft sleeve part.

A life cycle of the damping assembly shown in this application includes a first stage and a second stage.

In the first stage, the damping assembly provides a damping force by using a friction force generated between the first damping part and the first shaft sleeve part. As a quantity of times of rotation of the shaft sleeve relative to the damping section constantly increases, the first damping part wears, and the diameter of the first damping part becomes smaller until the interference amount between the first damping part and the first shaft sleeve part is equal to the second interference amount.

In the second stage, the damping assembly provides a damping force by using a friction force generated between the first damping part and the second shaft sleeve part and a friction force generated between the second damping part and the second shaft sleeve part. As a quantity of times of rotation of the shaft sleeve relative to the damping section constantly increases, the first damping part and the second damping part wear, the diameters of the first damping part and the second damping part become smaller, and the damping force provided by the damping assembly becomes smaller until the damping assembly finally fails.

In the damping assembly shown in this application, the damping force is provided by using the friction force generated between the damping section and the shaft sleeve, and the damping assembly has a simple structure and occupies a small space. In addition, an interference amount between the damping section and each part of the shaft sleeve is different, which helps prolong the service life of the damping assembly.

In an implementation, the first interference amount is greater than zero. That is, the first shaft sleeve part is in interference fit with the first damping part. In the first stage, the damping assembly provide a damping force by using a friction force generated through interference fit between the first shaft sleeve part and the first damping part. As a quantity of times of rotation of the shaft sleeve relative to the damping section constantly increases, the first damping part wears, the diameter of the first damping part becomes smaller, and the interference amount between the first damping part and the first shaft sleeve part becomes smaller until the interference amount between the first damping part and the first shaft sleeve part is equal to the second interference amount.

In an implementation, the second interference amount is greater than zero. That is, the second shaft sleeve part is in interference fit with the second damping part.

In the second stage, the damping assembly provides a damping force by using a friction force generated through interference fit between the first shaft sleeve part and the first damping part and a friction force generated through interference fit between the second shaft sleeve part and the second damping part. As a quantity of times of rotation of the shaft sleeve relative to the damping section constantly increases, the first damping part and the second damping part wear, the diameters of the first damping part and the second damping part become smaller, the interference amount between the first damping part and the first shaft sleeve part and the interference amount between the second damping part and the second shaft sleeve part become smaller, and the damping force provided by the damping assembly becomes smaller until the damping assembly finally fails.

In an implementation, the first damping parts each have a diameter greater than that of the second damping part, and the first shaft sleeve parts each have an inner diameter equal to or greater than a diameter of the second shaft sleeve part. In this case, the damping section is designed as a stepped structure.

In an implementation, two first damping parts are provided, and the two first damping parts are located on two opposite sides of the second damping parts respectively. Two first shaft sleeve parts are provided, and the two first shaft sleeve parts are located on two opposite sides of the second shaft sleeve parts respectively.

In the damping assembly shown in this implementation, the two first damping parts are located on the two opposite sides of the second damping parts respectively, and the two first shaft sleeve parts are located on the two opposite sides of the second shaft sleeve parts respectively, which helps improve rotation stability when the shaft sleeve rotates relative to the damping section.

In an implementation, two second damping parts are provided, and the two second damping parts are located between the two first damping parts. Two second shaft sleeve parts are provided, and the two second shaft sleeve parts are located between the two first shaft sleeve parts.

In an implementation, the first shaft sleeve parts each have a length equal to that of the first damping part, and the second shaft sleeve parts each have a length equal to that of the second damping part.

A product of a sum of the lengths of the two first damping parts and the first interference amount is equal to a product of the second interference amount and a sum of the lengths of the two first damping parts and the lengths of the two second damping parts, so that initial damping forces of the damping assembly in the first stage and the second stage are equal.

In this implementation, the damping assembly provides a damping force by using a friction force generated between the shaft sleeve and the damping section, and a change amplitude of the damping force of the damping assembly in each stage is relatively small. In the life cycle of the damping assembly shown in this implementation, because the initial damping forces in the first stage and the second stage are equal, it can be ensured that a damping handfeel of the damping assembly is relatively constant in the whole life cycle, which helps optimize use experience of a consumer.

In an implementation, the damping section further includes a third damping section, and the third damping section and the first damping parts are arranged in the axial direction of the damping section. The shaft sleeve includes a third shaft sleeve part, the third shaft sleeve part and the first shaft sleeve parts are arranged in the axial direction of the shaft sleeve, the third shaft sleeve part is sleeved onto the third damping part, an interference amount between the third shaft sleeve part and the third damping part is a third interference amount, and the third interference amount is less than the second interference amount.

A life cycle of the damping assembly shown in this implementation includes a first stage, a second stage, and a third stage.

In the second stage, the damping assembly provides a damping force by using a friction force generated between the first damping part and the second shaft sleeve part and a friction force generated between the second damping part and the second shaft sleeve part. As a quantity of times of rotation of the shaft sleeve relative to the damping section constantly increases, the first damping part and the second damping part wear, and the diameters of the first damping part and the second damping part become smaller, until the interference amount between the first damping part and the first shaft sleeve part and the interference amount between the second damping part and the second shaft sleeve part are equal to the third interference amount.

In the third stage, the damping assembly provides a damping force by using a friction force generated between the first damping part and the second shaft sleeve part, a friction force generated between the second damping part and the second shaft sleeve part, and a friction force generated between the third damping part and the third shaft sleeve part. As a quantity of times of rotation of the shaft sleeve relative to the damping section constantly increases, the first damping part, the second damping part, and the third damping part wear, the diameters of the first damping part, the second damping part, and the third damping part become smaller, and the damping force provided by the damping assembly becomes smaller until the damping assembly finally fails.

In an implementation, the third interference amount is greater than zero. That is, the third shaft sleeve part is in interference fit with the third damping part.

In the third stage, the damping assembly provides a damping force by using a friction force generated through interference fit between the first damping part and the second shaft sleeve part, a friction force generated through interference fit between the second damping part and the second shaft sleeve part, and a friction force generated through interference fit between the third damping part and the third shaft sleeve part. As a quantity of times of rotation of the shaft sleeve relative to the damping section constantly increases, the first damping part, the second damping part, and the third damping part wear, the diameters of the first damping part, the second damping part, and the third damping part become smaller, the interference amount between the first damping part and the first shaft sleeve part, the interference amount between the second damping part and the second shaft sleeve part, and the interference amount between the third damping part and the third shaft sleeve part become smaller, and the damping force provided by the damping assembly becomes smaller until the damping assembly finally fails.

In an implementation, the third damping part is located between the two second damping parts, and the two second damping parts and the two first damping parts are symmetrical with respect to the third damping part. The third shaft sleeve part is located between the two second shaft sleeve parts, and the two second shaft sleeve parts and the two first shaft sleeve parts are symmetrical with respect to the third shaft sleeve part. The symmetrical design of the damping section and the shaft sleeve helps ensure stability when the shaft sleeve rotates relative to the damping section.

In an implementation, the first shaft sleeve parts each have a length equal to that of the first damping part, the second shaft sleeve parts each have a length equal to that of the second damping part, and the third shaft sleeve part has a length equal to that of the third damping part.

A product of a sum of the lengths of the two first damping parts and the first interference amount, a product of the second interference amount and a sum of the lengths of the two first damping parts and the lengths of the two second damping parts, and a product of the third interference amount and a sum of the lengths of the two first damping parts, the lengths of the two second damping parts, and the length of the third damping part are equal, so that initial damping forces of the damping assembly in the first stage, the second stage, and the third stage are equal, to ensure that the damping handfeel of the damping assembly is relatively constant in the whole life cycle, which helps optimize use experience of the consumer.

In an implementation, the second damping parts each have a diameter greater than that of the third damping part, and the second shaft sleeve parts each have an inner diameter equal to or greater than a diameter of the third shaft sleeve part.

In an implementation, the first damping parts each have a diameter equal to that of the second damping part, and the first shaft sleeve parts each have an inner diameter less than that of the second shaft sleeve part.

In an implementation, two second damping parts are provided, and the two second damping parts are located on two opposite sides of the first damping parts respectively. Two second shaft sleeve parts are provided, and the two second shaft sleeve parts are located on two opposite sides of the first shaft sleeve parts respectively.

In the damping assembly shown in this implementation, the two second damping parts are located on the two opposite sides of the first damping parts respectively, and the two second shaft sleeve parts are located on the two opposite sides of the first shaft sleeve parts respectively, which helps improve rotation stability when the shaft sleeve rotates relative to the damping section.

In an implementation, the two second damping parts are symmetrical with respect to the first damping part, and the two second shaft sleeve parts are symmetrical with respect to the first shaft sleeve part. The symmetrical design of the damping section and the shaft sleeve helps ensure stability when the shaft sleeve rotates relative to the damping section.

In an implementation, the first shaft sleeve parts each have a length equal to that of the first damping part, and the second shaft sleeve parts each have a length equal to that of the second damping part.

A product of the length of the first damping part and the first interference amount is equal to a product of the second interference amount and a sum of the length of the first damping part and the lengths of the two second damping parts, so that the initial damping force in the first stage is equal to the initial damping force in the second stage.

In this implementation, the damping assembly provides a damping force by using a friction force generated between the shaft sleeve and the damping section, and a change amplitude of the damping force of the damping assembly in each stage is relatively small. In the life cycle of the damping assembly shown in this implementation, because the initial damping forces in the first stage and the second stage are equal, it can be ensured that a damping handfeel of the damping assembly is relatively constant in the whole life cycle, which helps optimize use experience of the consumer.

In an implementation, the damping section further includes a third damping section, and the third damping section and the first damping parts are arranged in the axial direction of the damping section. The shaft sleeve includes a third shaft sleeve part, the third shaft sleeve part and the first shaft sleeve parts are arranged in the axial direction of the shaft sleeve, and the third shaft sleeve part is sleeved onto the third damping part. An interference amount between the third shaft sleeve part and the third damping part is a third interference amount, and the third interference amount is less than the second interference amount.

A life cycle of the damping assembly shown in this implementation includes a first stage, a second stage, and a third stage.

In the second stage, the damping assembly provides a damping force by using a friction force generated between the first damping part and the second shaft sleeve part and a friction force generated between the second damping part and the second shaft sleeve part. As a quantity of times of rotation of the shaft sleeve relative to the damping section constantly increases, the first damping part and the second damping part wear, and the diameters of the first damping part and the second damping part become smaller, until the interference amount between the first damping part and the first shaft sleeve part and the interference amount between the second damping part and the second shaft sleeve part are equal to the third interference amount.

In the third stage, the damping assembly provides a damping force by using a friction force generated between the first damping part and the second shaft sleeve part, a friction force generated between the second damping part and the second shaft sleeve part, and a friction force generated between the third damping part and the third shaft sleeve part. As a quantity of times of rotation of the shaft sleeve relative to the damping section constantly increases, the first damping part, the second damping part, and the third damping part wear, the diameters of the first damping part, the second damping part, and the third damping part become smaller, and the damping force provided by the damping assembly becomes smaller until the damping assembly finally fails.

In an implementation, the third interference amount is greater than zero. That is, the third shaft sleeve part is in interference fit with the third damping part.

In the third stage, the damping assembly provides a damping force by using a friction force generated through interference fit between the first damping part and the second shaft sleeve part, a friction force generated through interference fit between the second damping part and the second shaft sleeve part, and a friction force generated through interference fit between the third damping part and the third shaft sleeve part. As a quantity of times of rotation of the shaft sleeve relative to the damping section constantly increases, the first damping part, the second damping part, and the third damping part wear, the diameters of the first damping part, the second damping part, and the third damping part become smaller, the interference amount between the first damping part and the first shaft sleeve part, the interference amount between the second damping part and the second shaft sleeve part, and the interference amount between the third damping part and the third shaft sleeve part become smaller, and the damping force provided by the damping assembly becomes smaller until the damping assembly finally fails.

In an implementation, two third damping parts are provided, and the two third damping parts are located on two opposite sides of the two second damping parts respectively. Two third shaft sleeve parts are provided, and the two third shaft sleeve parts are located on two opposite sides of the two second shaft sleeve parts respectively.

In the damping assembly shown in this implementation, the two third damping parts are located on the two opposite sides of the two second damping parts respectively, and the two third shaft sleeve parts are located on the two opposite sides of the two second shaft sleeve parts respectively, which helps improve rotation stability when the shaft sleeve rotates relative to the damping section.

In an implementation, the two third damping parts are symmetrical with respect to the first damping part, and the two third shaft sleeve parts are symmetrical with respect to the first shaft sleeve part. The symmetrical design of the damping section and the shaft sleeve helps ensure stability when the shaft sleeve rotates relative to the damping section.

In an implementation, the first shaft sleeve parts each have a length equal to that of the first damping part, the second shaft sleeve parts each have a length equal to that of the second damping part, and the third shaft sleeve part has a length equal to that of the third damping part.

A product of a sum of the lengths of the first damping parts and the first interference amount, a product of the second interference amount and a sum of the length of the first damping part and the lengths of the two second damping parts, and a product of the third interference amount and a sum of the length of the first damping part, the lengths of the two second damping parts, and the lengths of the two third damping parts are equal, so that initial damping forces of the damping assembly in the first stage, the second stage, and the third stage are equal, to ensure that the damping handfeel of the damping assembly is relatively constant in the whole life cycle, which helps optimize use experience of the consumer.

In an implementation, the second damping parts each have a diameter equal to that of the third damping part, and the second shaft sleeve parts each have an inner diameter less than that of the third shaft sleeve part.

According to a second aspect, this application provides a rotating mechanism, including two damping assemblies according to any one of the foregoing implementations, where the two damping assemblies are a first damping assembly and a second damping assembly, and a damping section of the first damping assembly and a damping section of the second damping assembly are arranged side by side and spaced apart from each other.

In the rotating mechanism shown in this application, two damping assemblies according to any one of the foregoing implementations are used, and the damping assemblies have a simple structure and occupies a small space, so that the rotating mechanism has a simple structure and occupies a small space.

In an implementation, the damping section of the first damping assembly and the damping section of the second damping assembly are arranged side by side and spaced apart from each other in a direction perpendicular to the damping section of the first damping assembly.

In an implementation, the rotating mechanism includes a first rotating shaft, a second rotating shaft, first swing arms, and second swing arms. The first rotating shaft includes a rotating shaft section and the damping section of the first damping assembly, and the rotating shaft section of the first rotating shaft and the damping section of the first damping assembly are spaced apart from each other in an axial direction of the first rotating shaft. The second rotating shaft includes a rotating shaft section and the damping section of the second damping assembly, and the rotating shaft section of the second rotating shaft and the damping section of the second damping assembly are spaced apart from each other in a circumferential direction of the second rotating shaft. The first swing arms are sleeved onto the rotating shaft section of the first rotating shaft, and are spaced apart from a shaft sleeve of the first damping assembly in the axial direction of the first rotating shaft. The second swing arms are sleeved onto the rotating shaft section of the second rotating shaft, and are spaced apart from a shaft sleeve of the second damping assembly in an axial direction of the second rotating shaft.

A direction in which each first swing arm rotates relative to the first rotating shaft is opposite to a direction in which each second swing arm rotates relative to the second rotating shaft.

In an implementation, two rotating shaft sections of the first rotating shaft are provided, and the two rotating shaft sections of the first rotating shaft are spaced apart from each other in the axial direction of the first rotating shaft. Two rotating shaft sections of the second rotating shaft are provided, and the two rotating shaft sections of the second rotating shaft are spaced apart from each other in the axial direction of the second rotating shaft. Two first swing arms are provided, the two first swing arms are sleeved onto the two rotating shaft sections of the first rotating shaft respectively, and are spaced apart from each other in the axial direction of the first rotating shaft. Two second swing arms are provided, and the two second swing arms are sleeved onto the two rotating shaft sections of the second rotating shaft respectively.

In an implementation, the rotating mechanism further includes a transmission member, and the transmission member is connected between the first rotating shaft and the second rotating shaft.

When the first swing arm rotates relative to the first rotating shaft, the transmission member drives the second swing arm to rotate relative to the second rotating shaft. Alternatively, when the second swing arm rotates relative to the second rotating shaft, the transmission member drives the first swing arm to rotate relative to the first rotating shaft, to implement synchronous rotation between the first swing arm and the first rotating shaft and between the second swing arm and the second rotating shaft.

According to a third aspect, this application provides a foldable terminal, including a first housing, a second housing, and the rotating mechanism according to any one of the foregoing implementations, where the first housing is fixedly connected to the shaft sleeve of the first damping assembly, and the second housing is fixedly connected to the shaft sleeve of the second damping assembly.

In the foldable terminal shown in this application, the rotating mechanism according to any one of the foregoing implementations is used, and the rotating mechanism has a simple structure and occupies a small space, so that the foldable terminal has a simple structure and occupies a small space, which is conductive to a lightening and thinning design of the foldable terminal.

In an implementation, the foldable terminal further includes a display, where the display includes a first display part, a second display part, and a foldable part, the foldable part is connected between the first display part and the second display part, the first display part is installed on the first housing, the second display part is installed on the second housing, and the foldable part is arranged opposite to the rotating mechanism.

BRIEF DESCRIPTION OF DRAWINGS

To describe the technical solutions in embodiments of this application or in the background more clearly, the following describes accompanying drawings required in the embodiments of this application or in the background.

FIG. 10 shows a life cycle curve of the first damping assembly shown in FIG. 9a;

DESCRIPTION OF EMBODIMENTS

Embodiments of this application are described below with reference to the accompanying drawings in the embodiments of this application.

Figure 1:
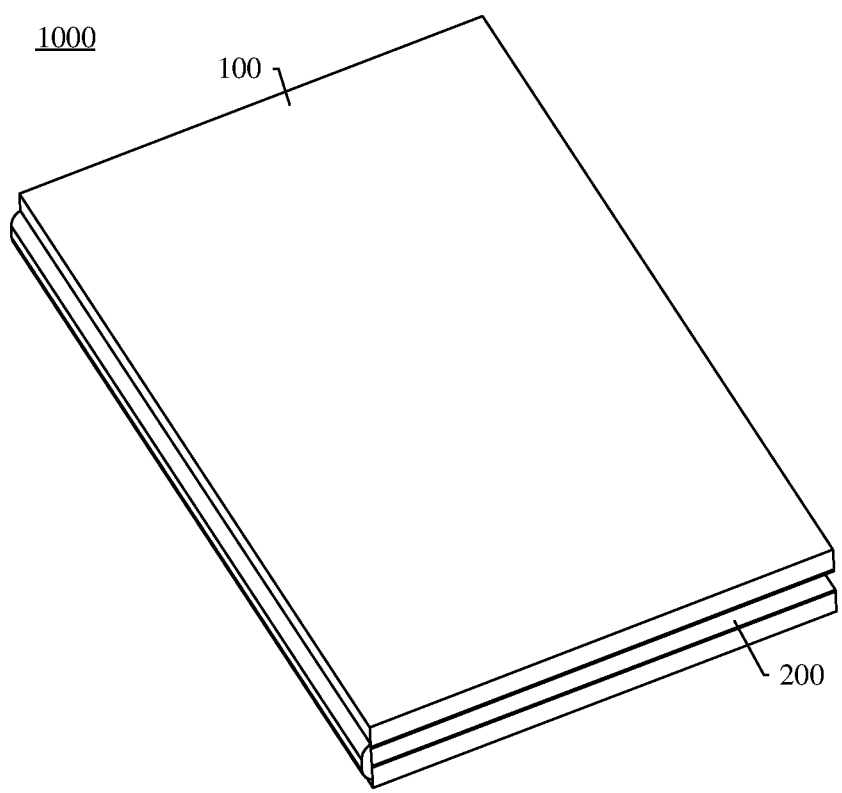
FIG. 1 is a schematic diagram of a structure of a foldable terminal in a state according to an embodiment of this application.
Figure 2:
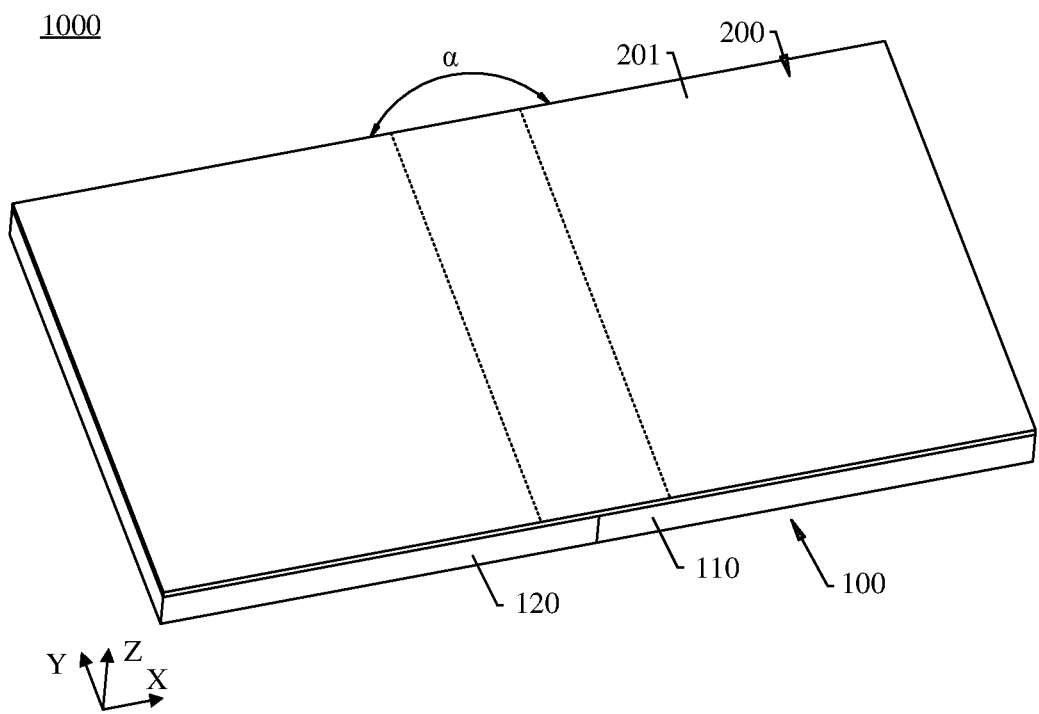
FIG. 2 is a schematic diagram of a structure of the foldable terminal shown in FIG. 1 in a second state.

FIG. 1 is a schematic diagram of a structure of a foldable terminal 1000 in a state according to an embodiment of this application, and FIG. 2 is a schematic diagram of a structure of the foldable terminal 1000 shown in FIG. 1 in a second state.

For ease of description, a width direction of the foldable terminal 1000 shown in FIG. 2 is defined as an X-axis direction, a length direction of the foldable terminal 1000 is defined as a Y-axis direction, and a thickness direction of the foldable terminal 1000 is defined as a Z-axis direction. The X-axis direction, the Y-axis direction, and the Z-axis direction are perpendicular to each other.

The foldable terminal 1000 may be a foldable electronic product such as a mobile phone, a tablet computer, a personal computer, a multimedia player, an e-book reader, a notebook computer, a vehicle-mounted device or a wearable device. In this embodiment, the foldable terminal 1000 is a foldable mobile phone. That is, the foldable terminal 1000 is a mobile phone that can be switched between a folded state and an unfolded state. In this embodiment of this application, an example in which the foldable terminal 1000 can be folded or unfolded in the X-axis direction is used for description.

The foldable terminal 1000 shown in FIG. 1 is in the folded state, and the foldable terminal 1000 shown in FIG. 2 is in the unfolded state. For example, an unfolding angle α of the foldable terminal 1000 shown in FIG. 2 is 180°. That is, the foldable terminal 1000 shown in FIG. 2 is in a flattened state. It should be noted that the angle illustrated in this embodiment of this application is allowed to have a little deviation. For example, that the unfolding angle α of the foldable terminal 1000 shown in FIG. 2 is 180° means that a may be 180° or about 180°, such as 170°, 175°, 185° or 190°. The angle illustrated later can be understood in the same way.

It should be understood that the foldable terminal 1000 shown in this embodiment of this application is a terminal that can be folded once. In some other embodiments, the foldable terminal 1000 may be a terminal that can be folded for multiple times (twice or more). In this case, the foldable terminal 1000 may include a plurality of parts, two adjacent parts may be folded relatively close to each other until the foldable terminal 1000 in the folded state, or two adjacent parts may be unfolded relatively away from each other until the foldable terminal 1000 in the unfolded state.

Figure 3:
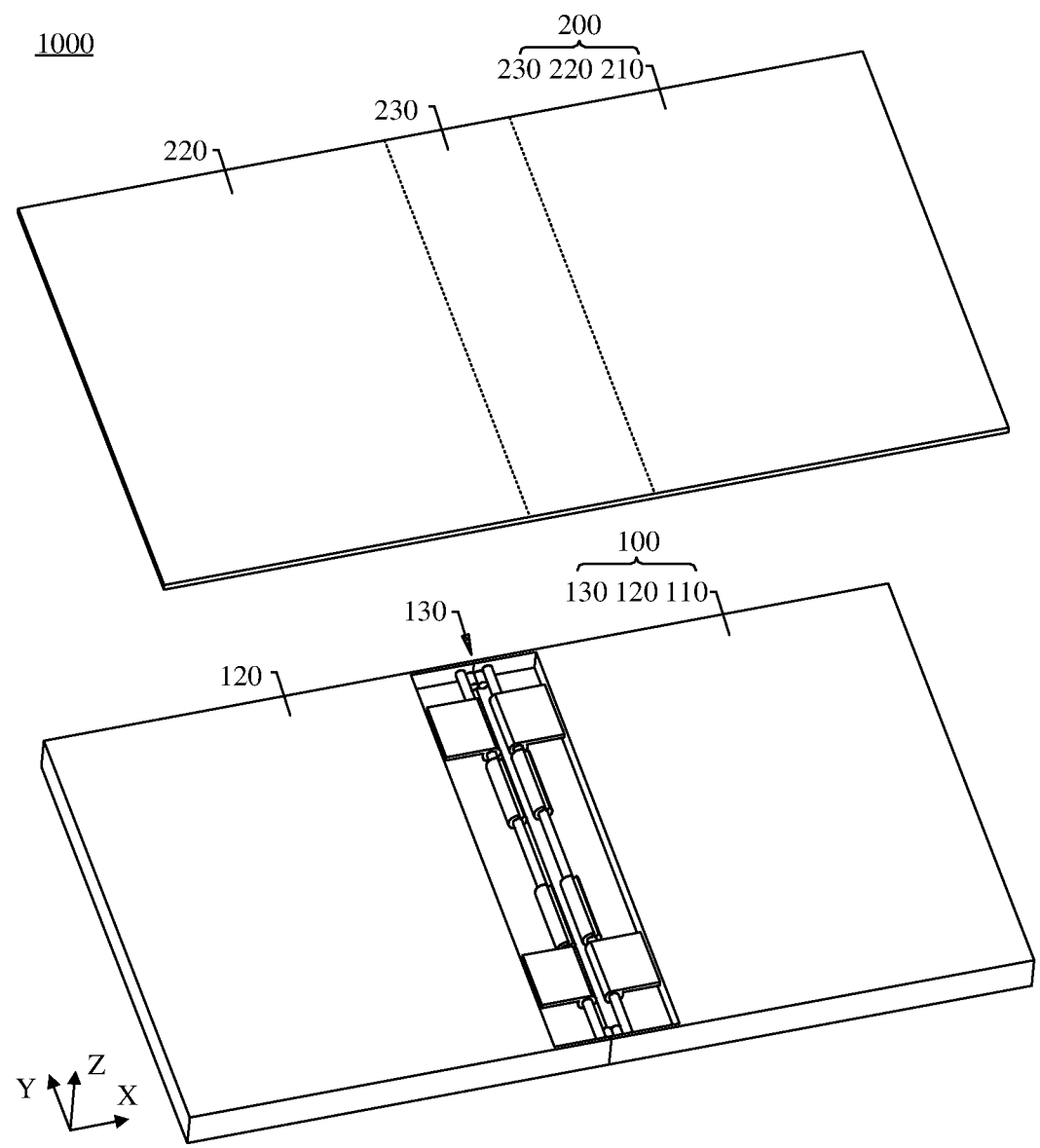
FIG. 3 is a schematic exploded view of a structure of the foldable terminal shown in FIG. 2.

FIG. 3 is a schematic exploded view of a structure of the foldable terminal 1000 shown in FIG. 2.

The foldable terminal 1000 includes a foldable apparatus 100 and a display 200, and the display 200 is installed on the foldable apparatus 100. The display 200 includes a display surface 201 facing away from the foldable apparatus 100, and the display surface 201 is used to display information such as text, images or videos. In this embodiment, the display 200 includes a first display part 210, a second display part 220, and a foldable part 230, and the foldable part 230 is connected between the first display part 210 and the second display part 220. The foldable part 230 can be bent in the X-axis direction.

As shown in FIG. 1, when the foldable terminal 1000 is in the folded state, the first display part 210 and the second display part 220 are arranged opposite to each other, and the foldable part 230 is bent. In this case, the display 200 is in the folded state, and an exposed area of the display 200 is relatively small, which can greatly reduce a probability of damage to the display 200 and effectively protect the display 200. As shown in FIG. 2, when the foldable terminal 1000 is in the unfolded state, the first display part 210 and the second display part 220 are unfolded relative to each other, and the foldable part 230 is flattened without bending. In this case, an included angle between the first display part 210 and the foldable part 230 and an included angle between the second display part 220 and the foldable part 230 are both a, and the display 200 has a large display region, which implements large-screen display of the foldable terminal 1000 and improves user experience.

It should be understood that the foldable terminal 1000 shown in this embodiment of this application is folded inward, and the display 200 of the foldable terminal 1000 in the folded state is located on an inner side of the foldable apparatus 100. In some other embodiments, the foldable terminal 1000 may alternatively be folded outward. In this case, the display 200 of the foldable terminal 1000 in the folded state is located on an outer side of the foldable apparatus 100.

In this embodiment, the foldable apparatus 100 includes a first housing 110, a second housing 120, and a rotating mechanism 130. The rotating mechanism 130 is connected between the first housing 110 and the second housing 120 to implement rotatable connection between the first housing 110 and the second housing 120. Specifically, the first housing 110 carries the first display part 210, and the second housing 120 carries the second display part 220. In other words, the first display part 210 is installed on the first housing 110, and the second display part 220 is installed on the second housing 120. The rotating mechanism 130 is arranged opposite to the foldable part 230.

The first housing 110 and the second housing 120 can rotate relative to each other by using the rotating mechanism 130, so that the foldable apparatus 100 is switched between the folded state and the unfolded state. Specifically, the first housing 110 and the second housing 120 can rotate relative to each other to be arranged opposite to each other, so that the foldable apparatus 100 is in the folded state, as shown in FIG. 1. The first housing 110 and the second housing 120 can alternatively rotate relative to each other to be unfolded relative to each other, so that the foldable apparatus 100 is in the unfolded state, as shown in FIG. 2. For example, the foldable terminal 1000 shown in FIG. 2 is in the flattened state, and an included angle between the first housing 110 and the second housing 120 is a.

Figure 4:
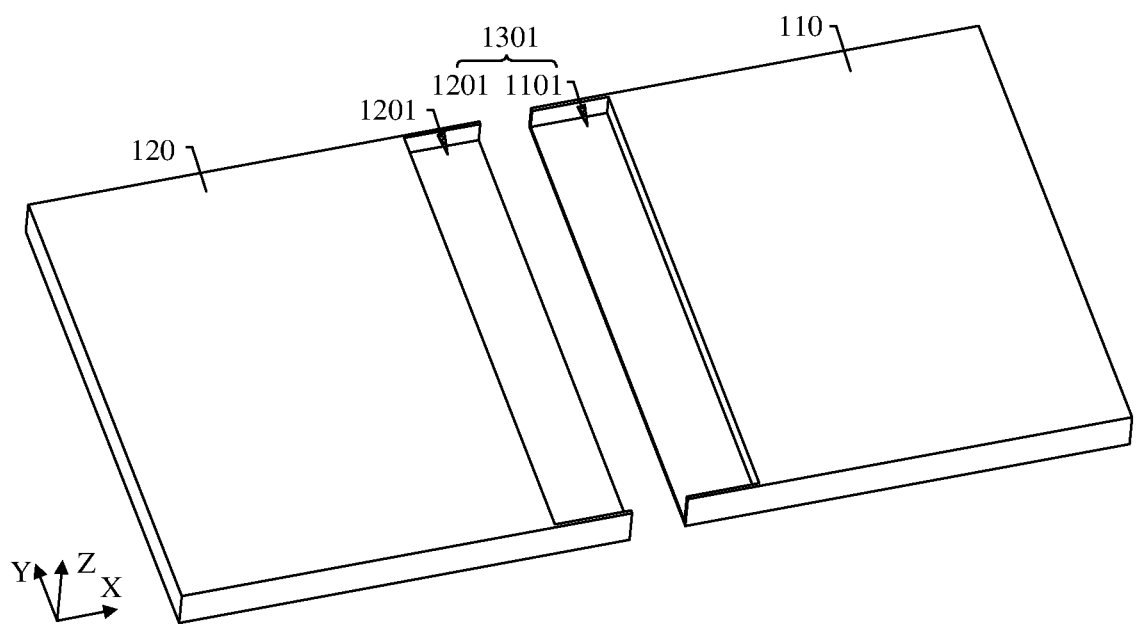
FIG. 4 is a schematic diagram of a structure of a first housing and a second housing of a foldable apparatus in the foldable terminal shown in FIG. 3.

FIG. 4 is a schematic diagram of a structure of a first housing 110 and a second housing 120 of a foldable apparatus 100 in the foldable terminal 1000 shown in FIG. 3.

The first housing 110 is provided with a first accommodating groove 1101, and the first accommodating groove 1101 is located on a side of the first housing 110 facing the second housing 120. An opening of the first accommodating groove 1101 is located on a top surface of the first housing 110. The first accommodating groove 1101 is recessed in a direction from the top surface to a bottom surface of the first housing 110, and runs through a side face of the first housing 110 facing the second housing 120.

The second housing 120 and the first housing 110 have the same structure and are mirror-symmetrical with respect to the rotating mechanism 130. The second housing 120 is provided with a second accommodating groove 1201, and the second accommodating groove 1201 is located on a side of the second housing 120 facing the first housing 110. An opening of the second accommodating groove 1201 is located on a top surface of the second housing 120. The second accommodating groove 1201 is recessed in a direction from the top surface to a bottom surface of the second housing 120, and runs through a side face of the second housing 120 facing the first housing 110. As shown in FIG. 3, when the foldable apparatus 100 is in the flattened state, that is, when the included angle between the first housing 110 and the second housing 120 is a, the first accommodating groove 1101 and the second accommodating groove 1201 enclose to form an accommodating space 1301, and the accommodating space 1301 accommodates the rotating mechanism 130.

It should be noted that the orientation words such as "top", "bottom", "left", "right", "front" and "back" used in this embodiment of this application to describe the foldable terminal 1000 are mainly explained based on a display orientation of the foldable terminal 1000 in FIG. 2, with a positive direction of the Z-axis as "top", a negative direction of the Z-axis as "bottom", a negative direction of the X-axis as "left", a positive direction of the Y-axis as "back", and a negative direction of the Y-axis as "front", which does not limit the orientation of the foldable terminal 1000 in an actual application scenario.

Figure 5:
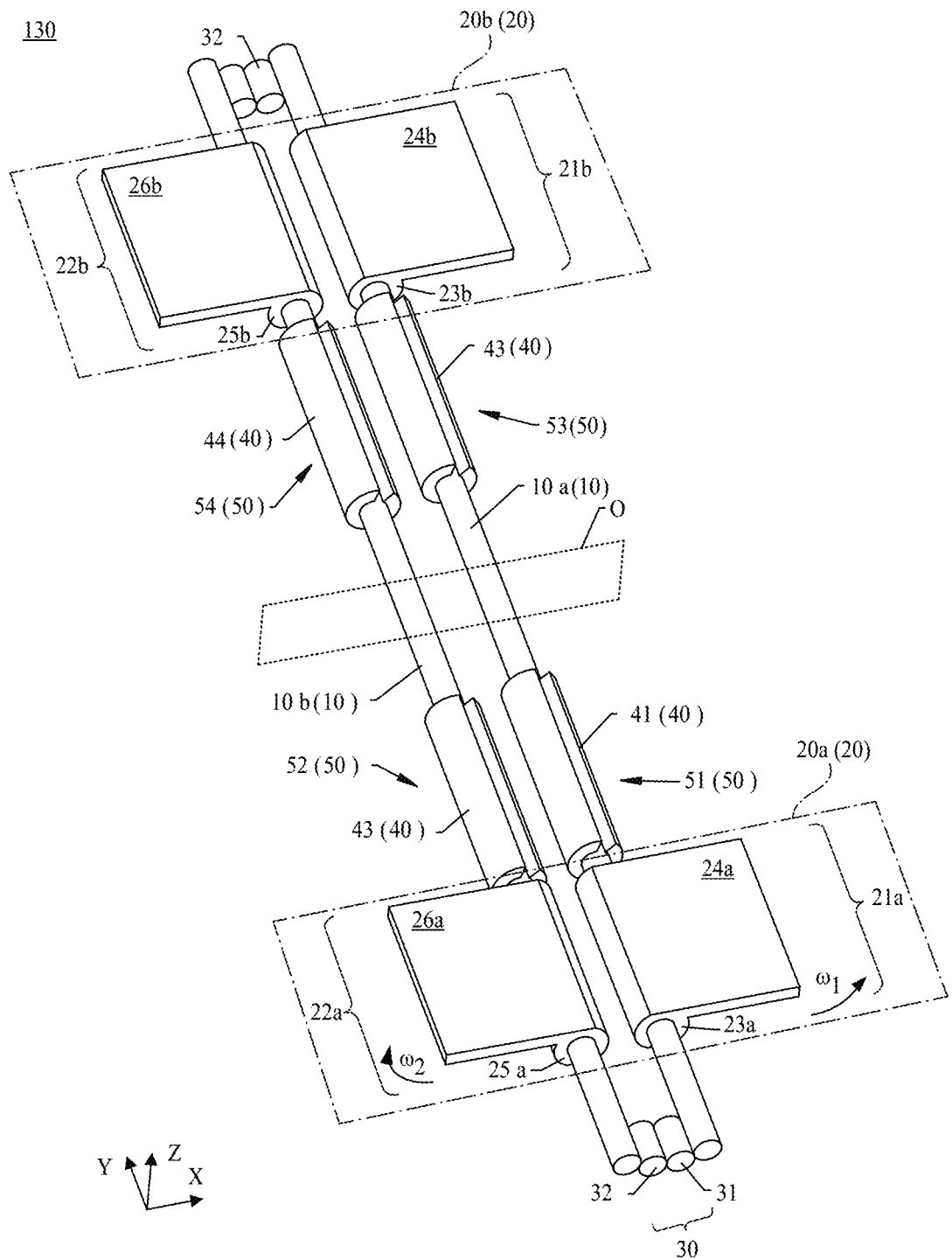
FIG. 5 is a schematic diagram of a structure of a rotating mechanism of the foldable apparatus in the foldable terminal shown in FIG. 3.
Figure 6:
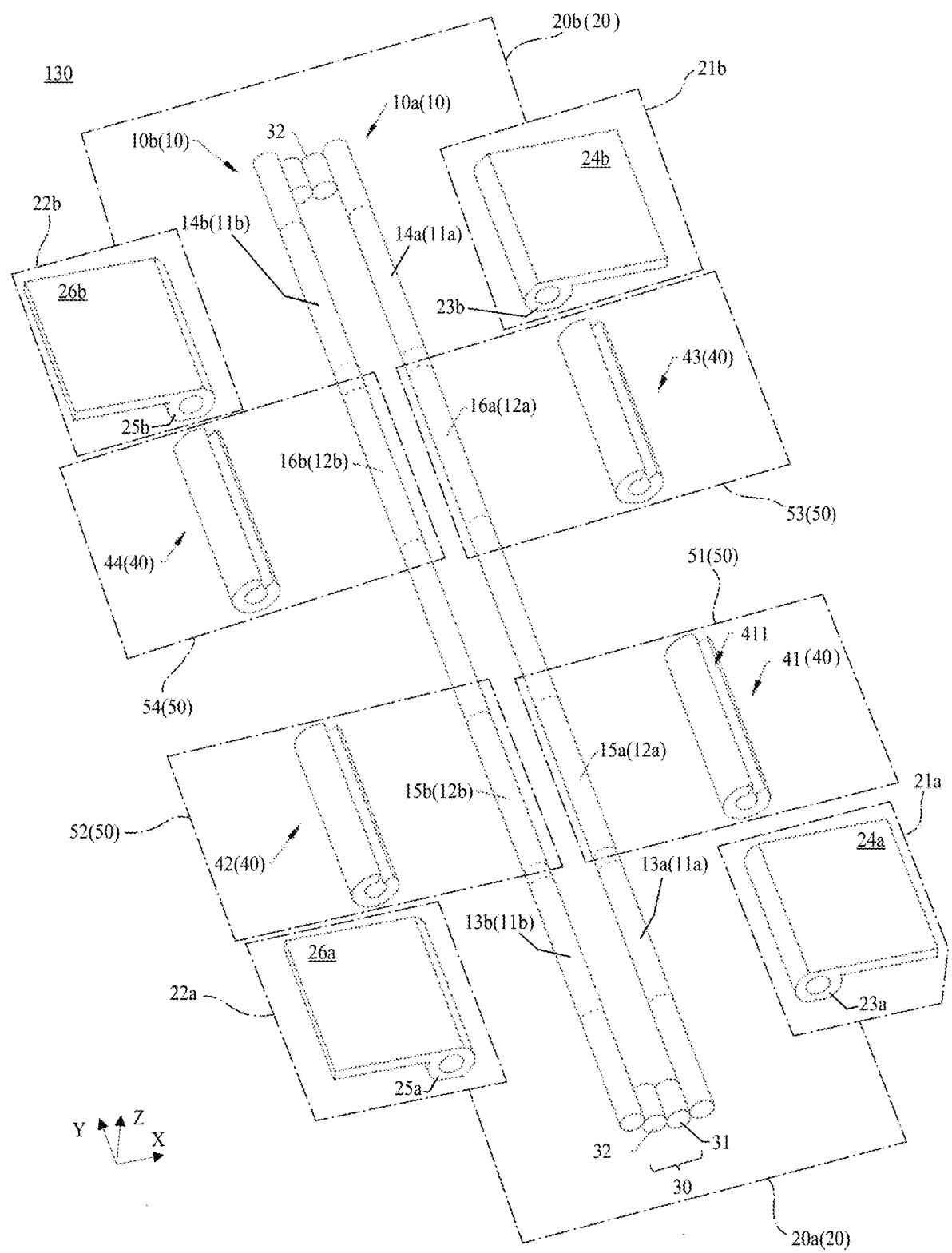
FIG. 6 is a schematic exploded view of a structure of the rotating mechanism shown in FIG. 5.

FIG. 5 is a schematic diagram of a structure of a rotating mechanism 130 of the foldable apparatus 100 in the foldable terminal 1000 shown in FIG. 3, and FIG. 6 is a schematic exploded view of a structure of the rotating mechanism 130 shown in FIG. 5.

In this embodiment, the rotating mechanism 130 has a symmetry plane O, and the rotating mechanism 130 is mirror-symmetrical with respect to the symmetry plane O. The rotating mechanism 130 includes rotating shafts 10 and rotating assemblies 20. Two rotating shafts 10 are provided, and axial directions of the two rotating shafts 10 are both the Y-axis direction. The two rotating shafts 10 are a first rotating shaft 10a and a second rotating shaft 10b, and the first rotating shaft 10a and the second rotating shaft 10b are spaced apart from each other in the X-axis direction. The first rotating shaft 10a is located on a side of the second rotating shaft 10b facing the positive direction of the X-axis.

The rotating assemblies 20 are sleeved onto the two rotating shafts 10. In this embodiment, two rotating assemblies 20 are provided, and the two rotating assemblies 20 are a first rotating assembly 20a and a second rotating assembly 20b. The first rotating assembly 20a and the second rotating assembly 20b are spaced apart from each other in the Y-axis direction. The first rotating assembly 20a is located on a side of the second rotating assembly 20b facing the negative direction of the Y-axis. In some other embodiments, one or three or more rotating assemblies 20 may alternatively be provided, and a quantity of rotating assemblies is not specifically limited in this embodiment of this application.

The first rotating shaft 10a is mirror-symmetrical with respect to the symmetry plane O. The first rotating shaft 10a includes rotating shaft sections 11a and damping sections 12a, where the rotating shaft sections 11a and the damping sections 12a are spaced apart from each other in the Y-axis direction. In this embodiment, two rotating shaft sections 11a are provided, and the two rotating shaft sections 11a are spaced apart from each other in the Y-axis direction, and are located at two opposite ends of the first rotating shaft 10a respectively. The two rotating shaft sections 11a are a first rotating shaft section 13a and a second rotating shaft section 14a, and the first rotating shaft section 13a is located on a side of the second rotating shaft section 14a facing the negative direction of the Y-axis. The first rotating shaft section 13a and the second rotating shaft section 14a are mirror-symmetrical with respect to the symmetry plane O. In some other embodiments, the first rotating shaft section 13a and the second rotating shaft section 14a may alternatively be not mirror-symmetrical with respect to the symmetry plane O.

Two damping sections 12a are provided, and the two damping sections 12a are located between the first rotating shaft section 13a and the second rotating shaft section 14a, and are spaced apart from each other in the Y-axis direction. The two damping sections 12a are a first damping section 15a and a second damping section 16a, and the first damping section 15a is located on a side of the second damping section 16a facing the negative direction of the Y-axis. In this case, the first damping section 15a is closer to the first rotating shaft section 13a than the second damping section 16a, and is spaced apart from the first rotating shaft section 13a. The second damping section 16a is closer to the second rotating shaft section 14a than the first damping section 15a, and is spaced apart from the second rotating shaft section 14a. The first damping section 15a and the second damping section 16a are mirror-symmetrical with respect to the symmetry plane O. In some other embodiments, the first damping section 15a and the second damping section 16a may alternatively be not mirror-symmetrical with respect to the symmetry plane O.

The second rotating shaft 10b has the same structure as the first rotating shaft 10a. The second rotating shaft 10b is mirror-symmetrical with respect to the symmetry plane O. The second rotating shaft 10b includes rotating shaft sections 11b and damping sections 12b, where the rotating shaft sections 11b and the damping sections 12b are spaced apart from each other in the Y-axis direction. In this embodiment, two rotating shaft sections 11b are provided, and the two rotating shaft sections 11b are spaced apart from each other in the Y-axis direction, and are located at two opposite ends of the second rotating shaft 10b respectively. The two rotating shaft sections 11b are a first rotating shaft section 13b and a second rotating shaft section 14b, and the first rotating shaft section 13b is located on a side of the second rotating shaft section 14b facing the negative direction of the Y-axis. The first rotating shaft section 13b and the second rotating shaft section 14b are mirror-symmetrical with respect to the symmetry plane O. In some other embodiments, the first rotating shaft section 13b and the second rotating shaft section 14b may alternatively be not mirror-symmetrical with respect to the symmetry plane O.

Two damping sections 12b are provided, and the two damping sections 12b are located between the first rotating shaft section 13b and the second rotating shaft section 14b, and are spaced apart from each other in the Y-axis direction. The two damping sections 12b are a first damping section 15b and a second damping section 16b, and the first damping section 15b and the second damping section 16b are mirror-symmetrical with respect to the symmetry plane O. The first damping section 15b is located on a side of the second damping section 16b facing the negative direction of the Y-axis. In this case, the first damping section 15b is closer to the first rotating shaft section 13b than the second damping section 16b, and is spaced apart from the first rotating shaft section 13b. The second damping section 16b is closer to the second rotating shaft section 14b than the first damping section 15b, and is spaced apart from the second rotating shaft section 14b. In some other embodiments, the first damping section 15b and the second damping section 16b may alternatively be not mirror-symmetrical with respect to the symmetry plane O.

The first rotating assembly 20a is sleeved onto the first rotating shaft 10a and the second rotating shaft 10b. The first rotating assembly 20a includes a first swing arm 21a and a second swing arm 22a. The first swing arm 21a is sleeved onto the first rotating shaft 10a, and the second swing arm 22a is sleeved onto the second rotating shaft 10b. The first swing arm 21a can rotate relative to the first rotating shaft 10a. The second swing arm 22a can rotate relative to the second rotating shaft 10b. A direction in which the first swing arm 21a rotates relative to the first rotating shaft 10a is a first direction, a direction in which the second swing arm 22a rotates relative to the first rotating shaft 10a is a second direction, and the first direction is opposite to the second direction. For example, the first direction is counterclockwise (a direction $W_1$ shown in the figure), and the second direction is clockwise (a direction ω2 shown in the figure).

The first swing arm 21a is sleeved onto the first rotating shaft section 13a of the first rotating shaft 10a. In this embodiment, the first swing arm 21a includes a first rotating part 23a and a first swinging part 24a, and the first rotating part 23a and the first swinging part 24a are fixedly connected to each other. Specifically, the first rotating part 23a is sleeved onto the first rotating shaft section 13a, and the first swinging part 24a extends from the first rotating part 23a in the positive direction of the X-axis. When rotating relative to the first rotating shaft 10a, the first swinging part 24a drives the first rotating part 23a to rotate relative to the first rotating shaft 10a.

The second swing arm 22 has the same structure as the first swing arm 21a. The second swing arm 22a is sleeved onto the first rotating shaft section 13b of the second rotating shaft 10b, and is mirror-symmetrical with the first swing arm 21a. In this embodiment, the second swing arm 22a includes a second rotating part 25a and a second swinging part 26a, and the second rotating part 25a and the second swinging part 26a are fixedly connected to each other. Specifically, the second rotating part 25a is sleeved onto the first rotating shaft section 13b, and the second swinging part 26a extends from a first rotating part 27a in the negative direction of the X-axis. When rotating relative to the second rotating shaft 10b, the second swinging part 26a drives the second rotating part 25a to rotate relative to the second rotating shaft 10b.

The second rotating assembly 20b has the same structure as the first rotating assembly 20a. The second rotating assembly 20b is sleeved onto the first rotating shaft 10a and the second rotating shaft 10b, and is mirror-symmetrical with the first rotating assembly 20a with respect to the symmetry plane O. In this embodiment, the second rotating assembly 20b includes a first swing arm 21b and a second swing arm 22b. The first swing arm 21b is sleeved onto the first rotating shaft 10a, and the second swing arm 22b is sleeved onto the second rotating shaft 10b. Specifically, a first rotating part 23b of the first swing arm 21b is sleeved onto the second rotating shaft section 14b of the first rotating shaft 10a, and a first swinging part 24b extends from the first rotating part 23b in the positive direction of the X-axis. A second rotating part 25b of the second swing arm 22b is sleeved onto the second rotating shaft section 14b of the second rotating shaft 10b, and a second swinging part 26b extends from the second rotating part 25b in the negative direction of the X-axis.

It should be noted that the structure of the second rotating assembly 20b is roughly the same as that of the first rotating assembly 20a. For the description of the structure of the second rotating assembly 20b, refer to the description of the first rotating assembly 20a. Details are not described herein again. In some other embodiments, the second rotating assembly 20b and the first rotating assembly 20a may alternatively be not mirror-symmetrical with respect to the symmetry plane O.

In addition, the rotating mechanism 130 further includes a transmission assembly 30, and the transmission assembly 30 is connected between the two rotating shafts 10. In this embodiment, the transmission assembly 30 includes a first transmission member 31 and a second transmission member 32, and the first transmission member 31 and the second transmission member 32 are both connected between the two rotating shafts 10, and are spaced apart from each other in the Y-axis direction. For example, the first transmission member 31 and the second transmission member 32 each may be a gear or another component that can implement transmission. Specifically, the first transmission member 31 is connected to an end of each of the two rotating shafts 10 facing the negative direction of the Y-axis, and the second transmission member 32 is connected to an end of each of the two rotating shafts 10 facing the positive direction of the Y-axis. The first transmission member 31 and the second transmission member 32 are mirror-symmetrical with respect to the symmetry plane O. In some other embodiments, the first transmission member 31 and the second transmission member 32 may alternatively be not mirror-symmetrical with respect to the symmetry plane O.

When the first swing arm 21a of the first rotating assembly 20a and the first swing arm 21b of the second rotating assembly 20b rotate relative to the first rotating shaft 10a, the transmission assembly 30 drives the second swing arm 22a of the first rotating assembly 20a and the second swing arm 22b of the second rotating assembly 20b to rotate relative to the second rotating shaft 10b. Alternatively, when the second swing arm 22a of the first rotating assembly 20a and the second swing arm 22b of the second rotating assembly 20b rotate relative to the second rotating shaft 10b, the transmission assembly 30 drives the first swing arm 21a of the first rotating assembly 20a and the first swing arm 21b of the second rotating assembly 20b to rotate relative to the first rotating shaft 10a, to implement synchronous rotation between the first rotating shaft 10a and both the first swing arm 21a and the first swing arm 21b and between the second rotating shaft 10b and both the second swing arm 22a and the second swing arm 22b.

Referring to FIG. 3 and FIG. 4, when the foldable apparatus 100 is in the flattened state, the rotating mechanism 130 is installed in the accommodating space 1301. Part of the rotating mechanism 130 is installed in the first accommodating groove 1101 of the first housing 110, and part of the rotating mechanism 130 is installed in the second accommodating groove 1201 of the second housing 120. Specifically, the first rotating shaft 10a, the first swing arm 21a of the first rotating assembly 20a, and the first swing arm 21b of the second rotating assembly 20b are all installed in the first accommodating groove 1101. The second rotating shaft 10b, the second swing arm 22a of the first rotating assembly 20a, and the second swing arm 22b of the second rotating assembly 20b are all installed in the second accommodating groove 1201. The first swing arm 21a of the first rotating assembly 20a and the first swing arm 21b of the second rotating assembly 20b are both fixedly connected to the housing 110. The second swing arm 22a of the first rotating assembly 20a and the second swing arm 22b of the second rotating assembly 20b are both fixedly connected to the second housing 120. When the first housing 110 and the second housing 120 are folded or unfolded relative to each other, the first housing 110 drives the first swing arm 21a and the first swing arm 21b to rotate relative to the first rotating shaft 10a, and the second housing 120 drives the second swing arm 22a and the second swing arm 22b to rotate relative to the second rotating shaft 10b.

In addition, the rotating mechanism 130 further includes four shaft sleeves 40, and the four shaft sleeves 40 are a first shaft sleeve 41, a second shaft sleeve 42, a third shaft sleeve 43, and a fourth shaft sleeve 44. Specifically, the first shaft sleeve 41 and the third shaft sleeve 43 are sleeved onto the first rotating shaft 10a, and are spaced apart from each other in the Y-axis direction. The second shaft sleeve 42 and the fourth shaft sleeve 44 are sleeved onto the second rotating shaft 10b, and are spaced apart from each other in the Y-axis direction. The first shaft sleeve 41 and the third shaft sleeve 43 are fixedly connected to the first housing 110, and can rotate relative to the first rotating shaft 10a. The second shaft sleeve 42 and the fourth shaft sleeve 44 are fixedly connected to the second housing 120, and can rotate relative to the second rotating shaft 10b.

In this embodiment, the first shaft sleeve 41 is sleeved onto the first damping section 15a of the first rotating shaft 10a, and the third shaft sleeve 43 is sleeved onto the second damping section 16a of the first rotating shaft 10a. Specifically, the first shaft sleeve 41 and the third shaft sleeve 43 are located between the first swing arm 21a of the first rotating assembly 20a and the first swing arm 21b of the second rotating assembly 20b, and are mirror-symmetrical with respect to the symmetry plane O. The first shaft sleeve 41 is located on a side of the third shaft sleeve 43 in the negative direction of the Y-axis. In this case, the first shaft sleeve 41 is closer to the first swing arm 21a of the first rotating assembly 20a than the third shaft sleeve 43, and is spaced apart from the first swing arm 21a. The third shaft sleeve 43 is closer to the first swing arm 21b of the second rotating assembly 20b than the first shaft sleeve 41, and is spaced apart from the first swing arm 21b.

The second shaft sleeve 42 is sleeved onto the first damping section 15b of the second rotating shaft 10b, and the fourth shaft sleeve 44 is sleeved onto the second damping section 16b of the second rotating shaft 10b. Specifically, the second shaft sleeve 42 and the fourth shaft sleeve 44 are located between the second swing arm 22a of the first rotating assembly 20a and the second swing arm 22b of the second rotating assembly 20b, and are mirror-symmetrical with respect to the symmetry plane O. The second shaft sleeve 42 is located on a side of the fourth shaft sleeve 44 in the negative direction of the Y-axis. In this case, the second shaft sleeve 42 is closer to the second swing arm 22a of the first rotating assembly 20a than the fourth shaft sleeve 44, and is spaced apart from the second swing arm 22a. The fourth shaft sleeve 44 is closer to the second swing arm 22b of the second rotating assembly 20b than the second shaft sleeve 42, and is spaced apart from the second swing arm 22b.

During folding and unfolding of the foldable terminal 1000, a friction force generated through the rotation of the first shaft sleeve 41 and the third shaft sleeve 43 relative to the first rotating shaft 10a and a friction force generated through the rotation of the second shaft sleeve 42 and the fourth shaft sleeve 44 relative to the second rotating shaft 10b are used to provide a damping force during folding and unfolding of the foldable terminal 1000, so as to ensure the damping handfeel of a user during folding and unfolding of the foldable terminal 1000, and improve user experience.

In an implementation, the rotating mechanism 130 includes damping assemblies 50, and the damping assemblies 50 are configured to provide a damping force during folding and unfolding of the foldable terminal 1000, so as to ensure the damping handfeel of the user during folding and unfolding of the foldable terminal 1000, and improve user experience. For example, four damping assemblies 50 are provided, and the four damping assemblies 50 are a first damping assembly 51, a second damping assembly 52, a third damping assembly 53, and a fourth damping assembly 54, and the first damping assembly 51 and the third damping assembly 53 are spaced apart from each other in the Y-axis direction, and are mirror-symmetrical with respect to the symmetry plane O. The second damping assembly 52 and the fourth damping assembly 54 are spaced apart from each other in the Y-axis direction, and are mirror-symmetrical with respect to the symmetry plane O.

Specifically, the first damping assembly 51 includes a first shaft sleeve 41 and a first damping section 15a of the first rotating shaft 10a. The second damping assembly 52 includes a second shaft sleeve 42 and a first damping section 15b of the second rotating shaft 10b. The third damping assembly 53 includes a third shaft sleeve 43 and a second damping section 16a of the first rotating shaft 10a. The fourth damping assembly 54 includes a fourth shaft sleeve 44 and a second damping section 16b of the second rotating shaft 10b.

It should be noted that structures of the first damping assembly 51, the second damping assembly 52, the third damping assembly 53, and the fourth damping assembly 54 are roughly the same. Next, the first damping assembly 51 is used as an example to describe the structure of the damping assembly 50 in detail. For the structures of the second damping assembly 52, the third damping assembly 53, and the fourth damping assembly 54, refer to the following structure description. Details are not described later again.

Figure 7:
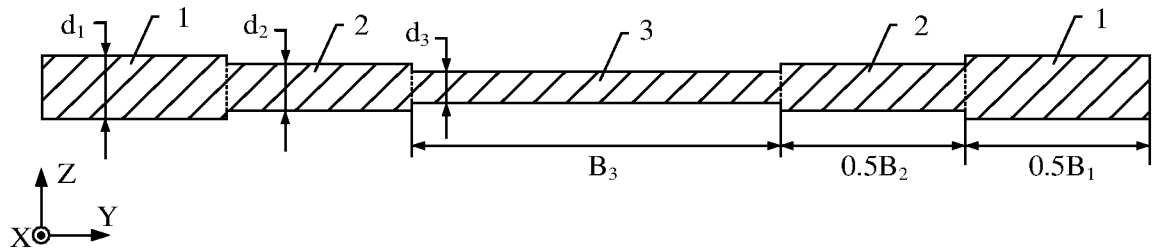
FIG. 7 is a schematic diagram of a cross-sectional structure of a first damping section of a first damping assembly in the rotating mechanism shown in FIG. 6 in an implementation.

FIG. 7 is a schematic diagram of a cross-sectional structure of a first damping section 15a of a first damping assembly 51 in the rotating mechanism 130 shown in FIG. 6 in an implementation.

The first damping section 15a includes first damping parts 1, second damping parts 2, and a third damping part 3 that are arranged in the Y-axis direction. The Y-axis direction is an axial direction of the first damping section 15a. Two first damping parts 1 are provided, and the two first damping parts 1 are spaced apart from each other in the Y-axis direction. The two first damping parts 1 are located at two opposite ends of the first damping section 15a respectively, and are symmetrical with respect to the third damping part 3. The first damping parts 1 each have a diameter of $d_1$. The first damping parts 1 each have a length of $0.5 B_1$.

The second damping parts 2 are located between the two first damping parts 1. That is, the two first damping parts 1 are located on two opposite sides of the second damping parts 2. Specifically, two second damping parts 2 are provided, and the two second damping parts 2 are located between the two first damping parts 1, and are spaced apart from each other in the Y-axis direction. The two second damping parts 2 are connected to the two first damping parts 1 respectively, and are symmetrical with respect to the third damping part 3. The second damping parts 2 each have a diameter of $d_2$, and $d_2$ is less than $d_1$. The second damping parts 2 each have a length of $0.5 B_2$. The third damping part 3 is located at a middle portion of the first damping section 15a. The third damping part 3 is located between the two second damping parts 2 and connected between the two second damping parts 2. The third damping part 3 has a diameter of $d_3$, and $d_3$ is less than $d_2$. The third damping part 3 has a length of $B_3$.

It should be noted that the first damping section 15a shown in this implementation includes the first damping parts 1, the second damping parts 2, and the third damping part 3, and the first damping part 1, the second damping part 2, and the third damping part 3 are sequentially arranged in the Y-axis direction. In some other implementations, the first damping section 15a may include only the first damping part 1 and the second damping part 2, but no third damping part 3; or the first damping part 1, the second damping part 2, and the third damping part 3 may not be sequentially arranged in the Y-axis direction, for example, the first damping part 1 may alternatively be located between the second damping part 2 and the third damping part 3. The arrangement order of the first damping part 1, the second damping part 2, and the third damping part is not specifically limited in this implementation of this application.

Referring to FIG. 6, the first shaft sleeve 41 is provided with a notch 411, and an opening of the notch 411 is located on an outer surface of the first shaft sleeve 41. The notch 411 is recessed in a direction from the outer surface to an inner surface of the first shaft sleeve 41, and runs through the inner surface of the first shaft sleeve 41 to implement communication between the inside of the first shaft sleeve 41 with the outside. In addition, the notch 411 extends in the Y-axis direction and runs through two end faces of the first shaft sleeve 41. It should be understood that the design of the notch 411 increases elasticity of the first shaft sleeve 41, and is conductive to assembly between the first shaft sleeve 41 and the first rotating shaft 10a.

Figure 8:
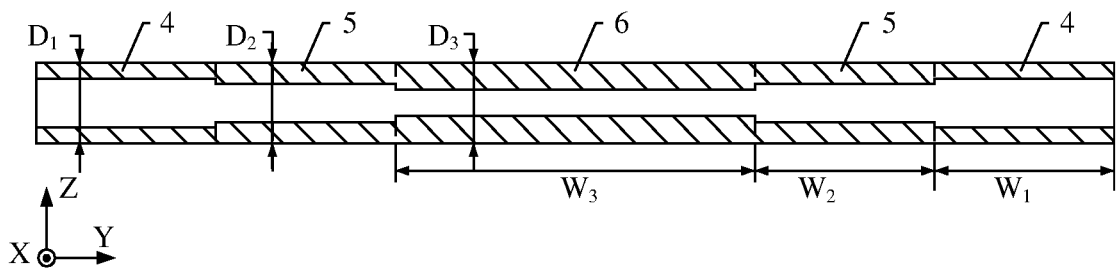
FIG. 8 is a schematic diagram of a cross-sectional structure of a first shaft sleeve of the first damping assembly in the rotating mechanism shown in FIG. 6 in an implementation.

FIG. 8 is a schematic diagram of a cross-sectional structure of a first shaft sleeve 41 of the first damping assembly 51 in the rotating mechanism 130 shown in FIG. 6 in an implementation.

In this implementation, the first shaft sleeve 41 has an elastic modulus less than that of the first damping section 15a. The first shaft sleeve 41 includes first shaft sleeve parts 4, second shaft sleeve parts 5, and a third shaft sleeve part 6 that are arranged in the Y-axis direction. The Y-axis direction is an axial direction of the first shaft sleeve 41. Two first shaft sleeve parts 4 are provided, and the two first shaft sleeve parts 4 are spaced apart from each other in the Y-axis direction. The two first shaft sleeve parts 4 are located at two opposite ends of the first shaft sleeve 41 respectively, and are symmetrical with respect to the third shaft sleeve part 6. The first shaft sleeve parts 4 each have an inner diameter of $D_1$. The first shaft sleeve parts 4 each have a length of $W_1$, and $W_1$ is equal to $0.5 B_1$.

The second shaft sleeve parts 5 are located between the two first shaft sleeve parts 4. That is, the two first shaft sleeve parts 4 are located on two opposite sides of the second shaft sleeve parts 5. Specifically, two second shaft sleeve parts 5 are provided, and the two second shaft sleeve parts 5 are spaced apart from each other in the Y-axis direction and located between the two first shaft sleeve parts 4. The two second shaft sleeve parts 5 are connected to the two first shaft sleeve parts 4 respectively, and are symmetrical with respect to the third shaft sleeve part 6. The second shaft sleeve parts 5 each have an inner diameter of $D_2$, and $D_2$ is less than $D_1$. The second shaft sleeve parts 5 each have a length of $W_2$, and $W_2$ is equal to $0.5 B_2$. The third shaft sleeve part 6 is located between the two second shaft sleeve parts 5 and connected between the two second shaft sleeve parts 5. The third shaft sleeve part 6 has an inner diameter of $D_3$, and $D_3$ is less than $D_2$. The third shaft sleeve part 6 has a length of $W_3$, and $W_3$ is equal to $B_3$.

Figure 9A:
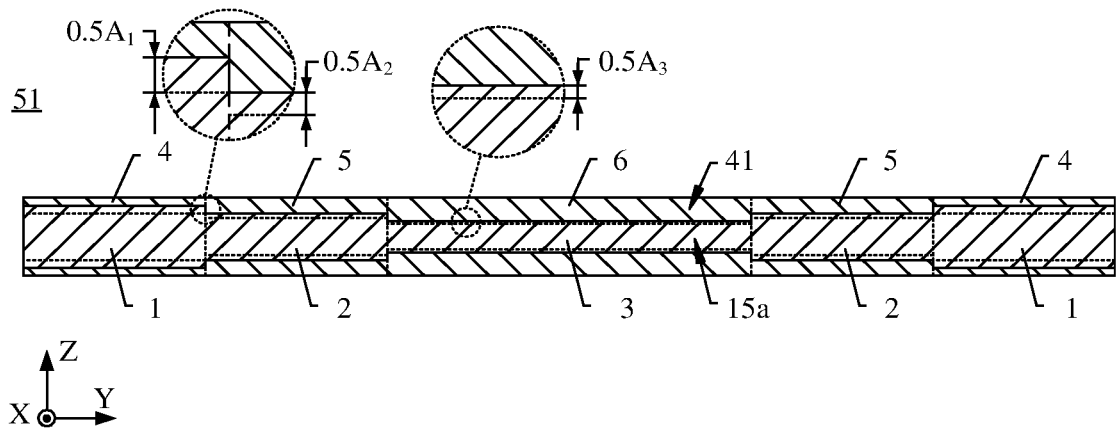
FIG. 9a is a schematic diagram of a cross-sectional structure of a first damping assembly in the rotating mechanism shown in FIG. 5 in an implementation.

FIG. 9a is a schematic diagram of a cross-sectional structure of a first damping assembly 51 in the rotating mechanism 130 shown in FIG. 5 in an implementation.

A first shaft sleeve 41 is sleeved onto a first damping section 15a. In this implementation, the first shaft sleeve 41 is in interference fit with the first damping part 15a. Specifically, two first shaft sleeve parts 4 are sleeved onto two first damping parts 1 respectively. The first shaft sleeve parts 4 are in interference fit with the first damping parts 1. An interference amount between the first shaft sleeve part 4 and the first damping part 1 is a first interference amount $A_1$. The first interference amount A1 is a difference between a diameter of the first damping part 1 and an inner diameter of the first shaft sleeve part 4. That is, $A_1 = d_1 - D_1$. In this case, $d_1$ is greater than $D_1$, and $A_1$ is greater than 0.

Two second shaft sleeve parts 5 are sleeved onto two second damping parts 2 respectively. The second shaft sleeve parts 5 are in interference fit with the second damping parts 2. An interference amount between the second shaft sleeve part 5 and the second damping part 2 is a second interference amount $A_2$. The second interference amount $A_2$ is a difference between a diameter of the second damping part 2 and an inner diameter of the second shaft sleeve part 5. That is, $A_2=d_2-D_2$. In this case, $d_2$ is greater than $D_2$, and $A_2$ is greater than 0 and less than $A_1$.

A third shaft sleeve part 6 is sleeved onto a third damping part 3. The third shaft sleeve part 6 is in interference fit with the third damping part 3. An interference amount between the third shaft sleeve part 6 and the third damping part 3 is a third interference amount $A_3$. The third interference amount $A_3$ is a difference between a diameter of the third damping part 3 and an inner diameter of the third shaft sleeve part 6. That is, $A_3=d_3-D_3$. In this case, $d_3$ is greater than $D_3$, and $A_3$ is greater than 0 and less than $A_2$.

Figure 9B:
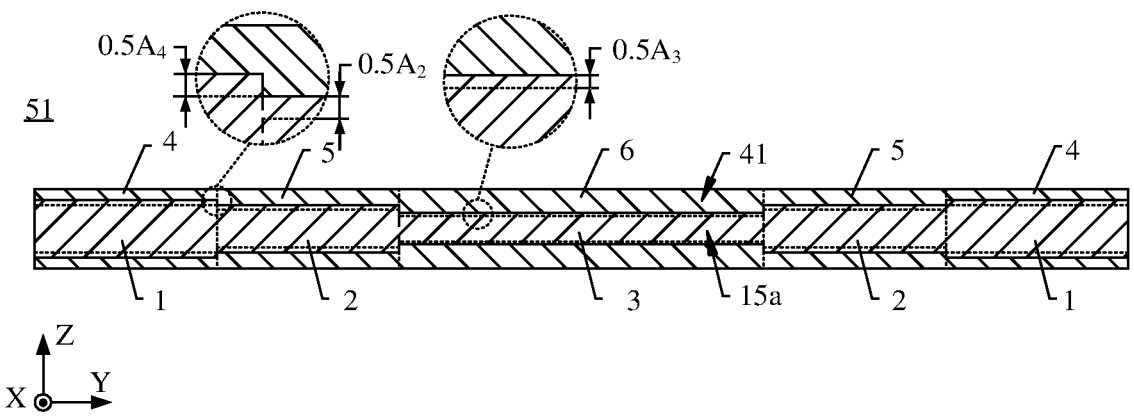
FIG. 9b is a schematic diagram of a cross-sectional structure of a first shaft sleeve and a first damping section of the first damping assembly shown in FIG. 9a after rotation relative to each other for $N_1$ times.
Figure 9C:
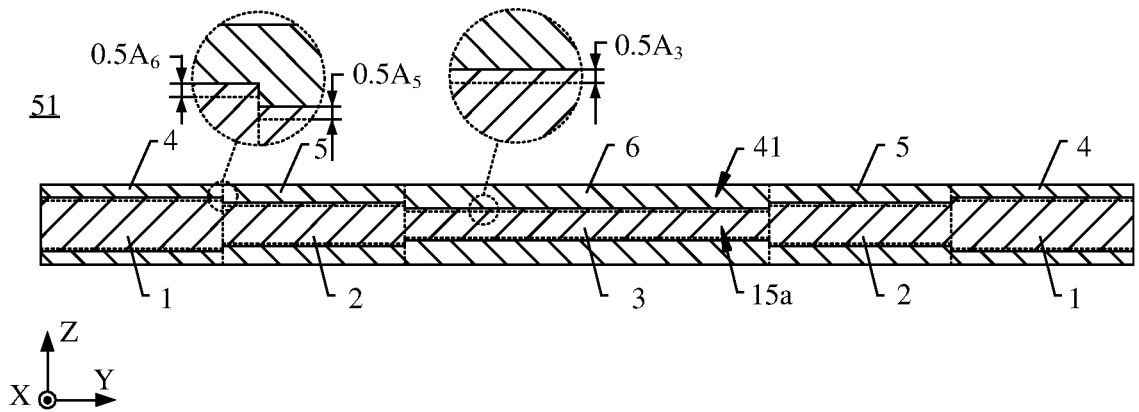
FIG. 9c is a schematic diagram of a cross-sectional structure of a first shaft sleeve and a first damping section of the first damping assembly shown in FIG. 9a after rotation relative to each other for $N_2$ times.
Figure 10:
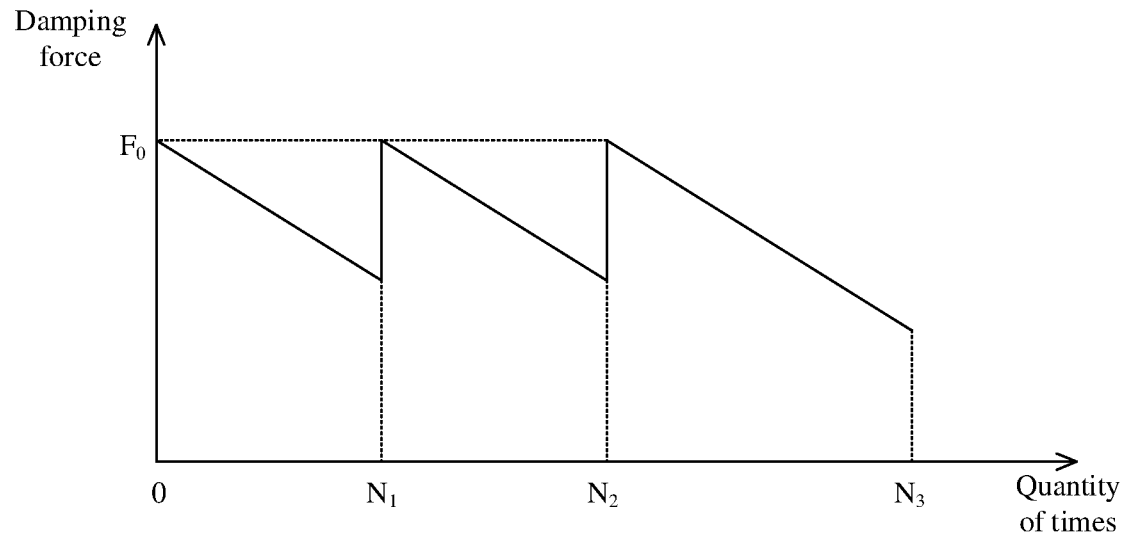

FIG. 9b is a schematic diagram of a cross-sectional structure of a first shaft sleeve 41 and a first damping section 15a of the first damping assembly 51 shown in FIG. 9a after rotation relative to each other for $N_1$ times, FIG. 9c is a schematic diagram of a cross-sectional structure of a first shaft sleeve 41 and a first damping section 15a of the first damping assembly 51 shown in FIG. 9a after rotation relative to each other for $N_2$ times, and FIG. 10 shows a life cycle curve of the first damping assembly 51 shown in FIG. 9a. In the curve shown in FIG. 10, the horizontal coordinate represents a quantity of times of relative rotation between the first shaft sleeve 41 and the first damping section 15a, and the vertical coordinate represents a damping force.

A life cycle of the first damping assembly 51 shown in this implementation includes a first stage, a second stage, and a third stage. $N_1$ times is a demarcation point between the first stage and the second stage, and $N_2$ times is a demarcation point between the second stage and the third stage.

In the first stage, that is, when the quantity of times of relative rotation between the first shaft sleeve 41 and the first damping section 15a is between 0 and $N_1$, a friction force generated due to interference fit between two first shaft sleeve parts 4 and two first damping parts 1 respectively is used to provide a damping force. At an initial point (that is, an origin shown in FIG. 10) of the first stage, the first damping assembly 51 has a damping force of $F_1$, $F_1=kA_1B_1$, and $F_1=F_0$. k is an elastic modulus of the first shaft sleeve 41. As the quantity of times of relative rotation between the first shaft sleeve 41 and the first damping section 15a constantly increases, the first damping parts 1 wear, the diameters of the first damping parts 1 become smaller, and the interference amount between the first shaft sleeve part 4 and the first damping part 1 also becomes smaller. Correspondingly, the damping force of the first damping assembly 51 also becomes smaller. After rotation for $N_1$ times, the interference amount between the first shaft sleeve part 4 and the first damping part 1 is $A_4$, and $A_4$ is equal to $A_2$, as shown in FIG. 9b.

In the second stage, that is, when the quantity of times of relative rotation between the first shaft sleeve 41 and the first damping section 15a is between $N_1$ and $N_2$, the friction force generated due to interference fit between the two first shaft sleeve parts 4 and the two first damping parts 1 and a friction force generated due to interference fit between the two second shaft sleeve parts 5 and the two second damping parts 2 are used to provide a damping force. At an initial point (that is, $N_1$ times shown in FIG. 10) of the second stage, the first damping assembly 51 has a damping force of $F_2$, $F_2=kA_2(B_1+B_2)$, and $F_2=F_1$. As the quantity of times of relative rotation between the first shaft sleeve 41 and the first damping section 15a constantly increases, the first damping parts 1 and the second damping parts 2 wear, the diameters of the first damping parts 1 and the second damping parts 2 become smaller, and the interference amount between the first shaft sleeve part 4 and the first damping part 1 and the interference amount between the second shaft sleeve part 5 and the second damping part 2 become smaller. Correspondingly, the damping force of the first damping assembly 51 also becomes smaller. After rotation for $N_2$ times, an interference amount between the first shaft sleeve part 4 and the first damping part 1 is $A_5$, an interference amount between the second shaft sleeve part 5 and the second damping part 2 is $A_6$, and $A_5$ and $A_6$ are equal to $A_3$, as shown in FIG. 9c.

In the third stage, that is, when the quantity of times of relative rotation between the first shaft sleeve 41 and the first damping section 15a is greater than $N_2$, the friction force generated due to interference fit between the two first shaft sleeve parts 4 and the two first damping parts 1, the friction force generated due to interference fit between the two second shaft sleeve parts 5 and the two second damping parts 2, and a friction force generated due to interference fit between the third shaft sleeve part 6 and the third damping part 3 are used to provide a damping force. At an initial point (that is, $N_2$ times shown in FIG. 10) of the second stage, the first damping assembly 51 has a damping force of $F_3$, $F_3=kA_3(B_1+B_2+B_3)$, and $F_3=F_2$. As the quantity of times of relative rotation between the first shaft sleeve 41 and the first damping section 15a constantly increases, the first damping parts 1, the second damping parts 2, and the third damping part 3 wear, the diameters of the first damping parts 1, the second damping parts 2, and the third damping part 3 become smaller, and the interference amount between the first shaft sleeve part 4 and the first damping part 1, the interference amount between the second shaft sleeve part 5 and the second damping part 2, and the interference amount between the third shaft sleeve part 6 and the third damping part 3 become smaller. Correspondingly, the damping force of the first damping assembly 51 also becomes smaller, until the first damping assembly 51 finally fails.

In the first damping assembly 51 shown in this implementation, when the first shaft sleeve 41 rotates relative to the first rotating shaft 10a, the damping effect is achieved by using the friction force generated through the interference fit between the first shaft sleeve 41 and the first damping section 15a. The first damping assembly 51 has a simple structure and occupies a small space, which is conductive to a lightening and thinning design of the foldable terminal 1000. In addition, the stepped design of interference amounts between the first damping section 15a and a plurality of parts of the first shaft sleeve 41 prolongs the service life of the first damping assembly 51. In addition, the symmetrical design of the first damping section 15a and the first shaft sleeve 41 ensures stability during rotation of the first shaft sleeve 41 relative to the first rotating shaft 10a.

In addition, the first damping assembly 51 provides the damping force by using the friction force generated through the interference fit between the first shaft sleeve 41 and the first damping section 15a, so that a change amplitude of the damping force of the first damping assembly 51 in each stage is relatively small. In the life cycle of the first damping assembly 51 shown in this implementation, the initial damping forces in the three stages are equal, so that it can be ensured that a damping handfeel of the first damping assembly 51 is relatively constant in the whole life cycle, which helps optimize use experience of the consumer.

It should be noted that the damping force of the first damping assembly 51 shown in this implementation is designed mainly by using the wear of the first damping section 15a in the whole life cycle. In some other implementations, the wear of the first shaft sleeve 41 in the life cycle may also be used to design the damping force of the first damping assembly 51.

Figure 11:
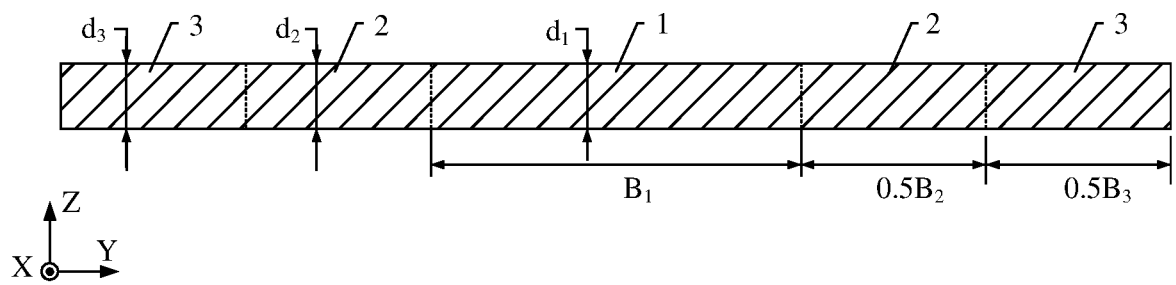
FIG. 11 is a schematic diagram of a cross-sectional structure of a first damping section of a first damping assembly in the rotating mechanism shown in FIG. 6 in a second implementation.

FIG. 11 is a schematic diagram of a cross-sectional structure of a first damping section 15a of a first damping assembly 51 in the rotating mechanism 130 shown in FIG. 6 in a second implementation.

The first damping section 15a includes first damping parts 1, second damping parts 2, and a third damping part 3 that are arranged in the Y-axis direction. The Y-axis direction is an axial direction of the first damping section 15a. The first damping section 15a shown in this implementation differs from the first damping section 15a in the foregoing implementation in that a first damping part 1 is located at a middle portion of the first damping section 15a. The first damping part 1 has a diameter of $d_1$. The first damping part 1 has a length of $B_1$. Two second damping parts 2 are provided, and the two second damping parts 2 are spaced apart from each other in the Y-axis direction, and are located on two opposite sides of the first damping part 1. The two second damping parts 2 are connected to the two opposite ends of the first damping part 1, and are symmetrical with respect to the first damping part 1. The second damping parts 2 each have a diameter of $d_2$, and $d_2$ is equal to $d_1$. The second damping parts 2 each have a length of $0.5 B_2$. Two third damping parts 3 are provided, and the two third damping parts 3 are spaced apart from each other in the Y-axis direction. The two third damping parts 3 are located at two opposite ends of the first damping section 15a respectively, and are located on two opposite sides of the two second damping parts 2. The two third damping parts 3 are connected to the two second damping parts 2 respectively, and are symmetrical with respect to the first damping part 1. The third damping parts 3 each have a diameter of $d_3$, and $d_3$ is equal to $d_2$. The third damping parts 3 each have a length of $0.5 B_3$.

Figure 12:
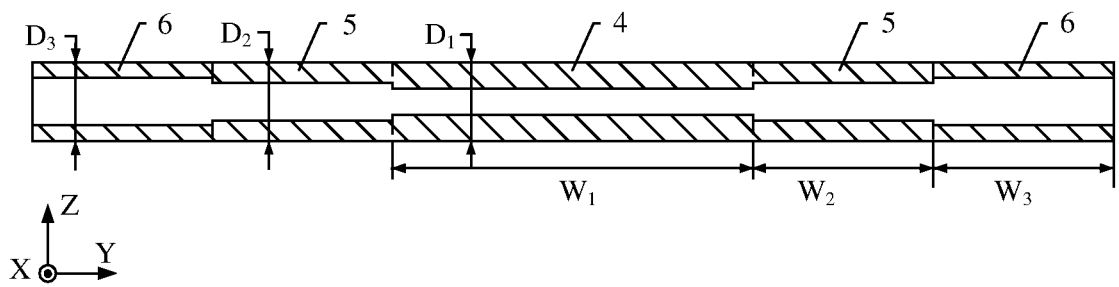
FIG. 12 is a schematic diagram of a cross-sectional structure of a first shaft sleeve of the first damping assembly in the rotating mechanism shown in FIG. 6 in a second implementation.

FIG. 12 is a schematic diagram of a cross-sectional structure of a first shaft sleeve 41 of the first damping assembly 51 in the rotating mechanism 130 shown in FIG. 6 in a second implementation.

The first shaft sleeve 41 includes first shaft sleeve parts 4, second shaft sleeve parts 5, and a third shaft sleeve part 6 that are arranged in the Y-axis direction. The Y-axis direction is an axial direction of the first shaft sleeve 41. The first shaft sleeve 41 shown in this implementation differs from the first shaft sleeve 41 in the foregoing first implementation in that a first shaft sleeve part 4 is located at a middle portion of the first shaft sleeve 41. The first shaft sleeve part 4 has an inner diameter of $D_1$. The first shaft sleeve part 4 has a length of $W_1$, and $W_1$ is equal to $B_1$. Two second shaft sleeve parts 5 are provided, and the two second shaft sleeve parts 5 are spaced apart from each other in the Y-axis direction, and are located on two opposite sides of the first shaft sleeve part 4 respectively. The two second shaft sleeve parts 5 are connected to two opposite ends of the first shaft sleeve part 4, and are symmetrical with respect to the first shaft sleeve part 4. The second shaft sleeve parts 5 each have an inner diameter of $D_2$, and $D_2$ is greater than $D_1$. The second shaft sleeve parts 5 each have a length of $W_2$, and $W_2$ is equal to $0.5 B_2$. Two third shaft sleeve parts 6 are provided, and the two third shaft sleeve parts 6 are spaced apart from each other in the Y-axis direction. The two third shaft sleeve parts 6 are located at two opposite ends of the first shaft sleeve 41 respectively, and are located on two opposite sides of the two second shaft sleeve parts 5. The two third shaft sleeve parts 6 are connected to the two second shaft sleeve parts 5 respectively, and are symmetrical with respect to the first shaft sleeve part 4. The third shaft sleeve parts 6 each have an inner diameter of $D_3$, and $D_3$ is greater than $D_2$. The third shaft sleeve parts 6 each have a length of $W_3$, and $W_3$ is equal to $0.5 B_3$.

Figure 13A:
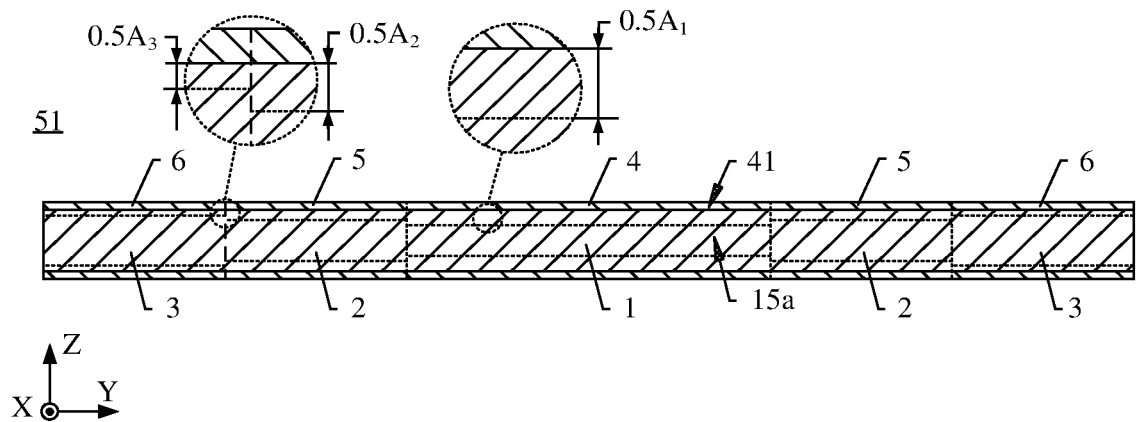
FIG. 13a is a schematic diagram of a cross-sectional structure of a first damping assembly in the rotating mechanism shown in FIG. 5 in a second implementation.

FIG. 13a is a schematic diagram of a cross-sectional structure of a first damping assembly 51 in the rotating mechanism 130 shown in FIG. 5 in a second implementation.

A first shaft sleeve 41 is sleeved onto a first damping section 15a. In this implementation, the first shaft sleeve 41 is in interference fit with the first damping part 15a. Specifically, a first shaft sleeve part 4 is sleeved onto a first damping part 1, two second shaft sleeve parts 5 are sleeved onto two second damping parts 2 respectively, and two third shaft sleeve parts 6 are sleeved onto two third damping parts 3 respectively. The first shaft sleeve part 4 is in interference fit with the first damping part 1, an interference amount between the first shaft sleeve part 4 and the first damping part 1 is a first interference amount $A_1$, $A_1=d_1-D_1$, $d_1$ is greater than $D_1$, and $A_1$ is greater than 0. The second shaft sleeve part 5 is in interference fit with the second damping part 2, an interference amount between the second shaft sleeve part 5 and the second damping part 2 is a second interference amount $A_2$, $A_2=d_2-D_2$, $d_2$ is greater than $D_2$, and $A_2$ is greater than 0 and less than $A_1$. The third shaft sleeve part 6 is in interference fit with the third damping part 3, an interference amount between the third shaft sleeve part 6 and the third damping part 3 is a third interference amount $A_3$, $A_3=d_3-D_3$, $d_3$ is greater than $D_3$, and $A_3$ is greater than 0 and less than $A_2$.

Figure 13B:
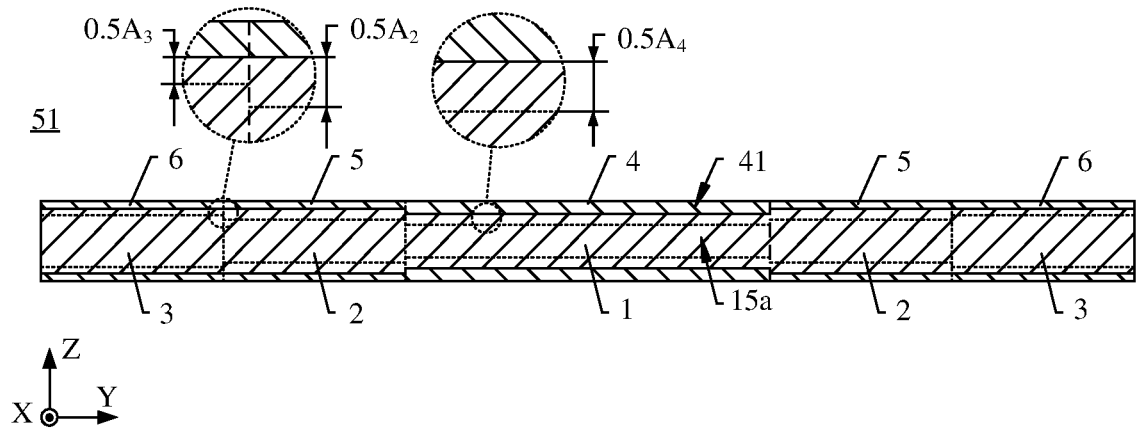
FIG. 13b is a schematic diagram of a cross-sectional structure of the first damping assembly shown in FIG. 13a after rotation relative to each other for $N_1$ times.
Figure 13C:
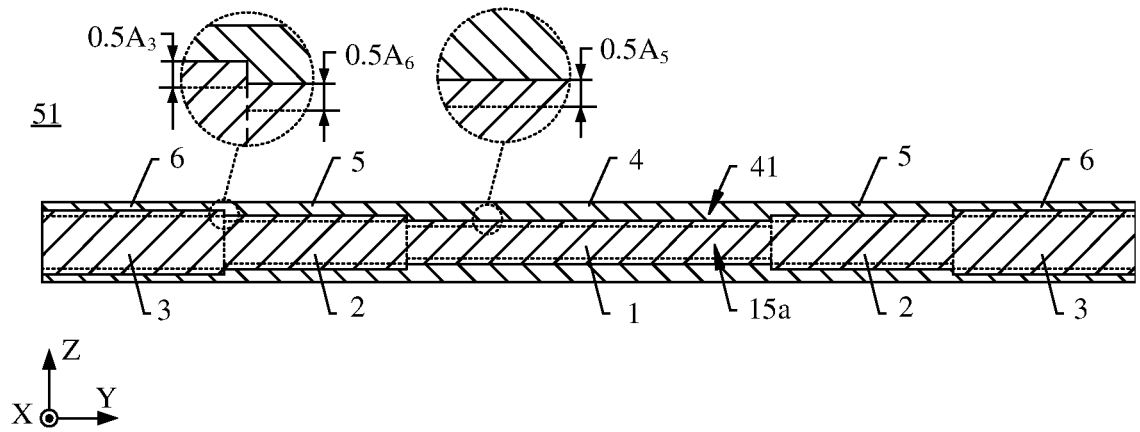
FIG. 13c is a schematic diagram of a cross-sectional structure of the first damping assembly shown in FIG. 13a after rotation relative to each other for $N_2$ times.

FIG. 13b is a schematic diagram of a cross-sectional structure of the first damping assembly 51 shown in FIG. 13a after rotation relative to each other for $N_1$ times, and FIG. 13c is a schematic diagram of a cross-sectional structure of the first damping assembly 51 shown in FIG. 13a after rotation relative to each other for $N_2$ times.

A life cycle of the first damping assembly 51 shown in this implementation includes a first stage, a second stage, and a third stage. $N_1$ times is a demarcation point between the first stage and the second stage, and $N_2$ times is a demarcation point between the second stage and the third stage.

In the first stage, a friction force generated due to interference fit between the first shaft sleeve part 4 and the first damping part 1 is used to provide a damping force. After relative rotation between the first shaft sleeve 41 and the first damping section 15a for $N_1$ times, an interference amount between the first shaft sleeve part 4 and the first damping part 1 is $A_4$, and $A_4$ is equal to $A_2$. The friction force generated due to interference fit between the first shaft sleeve part 4 and the first damping part 1 and a friction force generated due to interference fit between the two second shaft sleeve parts 5 and the two second damping parts 2 are used to provide a damping force. After relative rotation between the first shaft sleeve 41 and the first damping section 15a for $N_1$ times, an interference amount between the first shaft sleeve part 4 and the first damping part 1 is $A_5$, an interference amount between the second shaft sleeve part 5 and the second damping part 2 is $A_6$, and $A_5$ and $A_6$ are equal to $A_3$. In the third stage, the friction force generated due to interference fit between the first shaft sleeve part 4 and the first damping part 1, the friction force generated due to interference fit between the two second shaft sleeve parts 5 and the two second damping parts 2, and a friction force generated due to interference fit between the two third shaft sleeve parts 6 and the two third damping parts 3 are used to provide a damping force. As the quantity of times of relative rotation between the first shaft sleeve 41 and the first damping section 15a constantly increases, the interference amount between the first shaft sleeve part 4 and the first damping part 1, the interference amount between the second shaft sleeve part 5 and the second damping part 2, and the interference amount between the third shaft sleeve part 6 and the third damping part 3 become smaller. The damping force of the first damping assembly 51 also becomes smaller, until the first damping assembly 51 finally fails.

It should be noted that the life cycle of the first damping assembly 51 shown in this implementation is roughly the same as that of the first damping assembly 51 shown in the foregoing first implementation. For the rest of the life cycle of the first damping assembly 51 shown in this implementation, refer to the related description of the life cycle of the first damping assembly 51 shown in the foregoing first implementation. Details are not described herein again.

Figure 14:
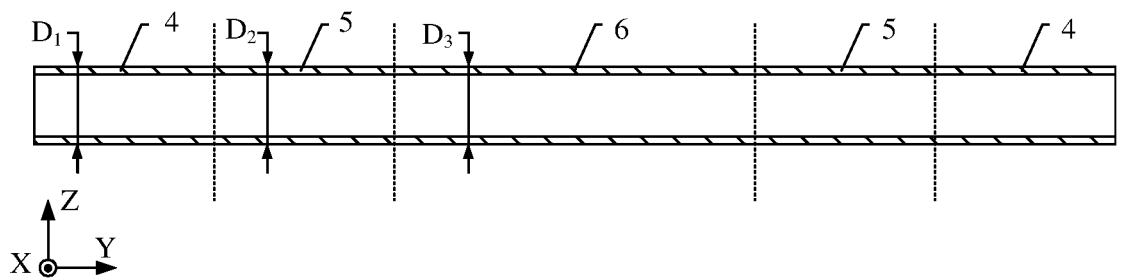
FIG. 14 is a schematic diagram of a cross-sectional structure of a first shaft sleeve of the first damping assembly in the rotating mechanism shown in FIG. 6 in a third implementation.

FIG. 14 is a schematic diagram of a cross-sectional structure of a first shaft sleeve 41 of the first damping assembly 51 in the rotating mechanism 130 shown in FIG. 6 in a third implementation.

The first damping assembly 51 shown in this implementation differs from the first damping assembly 51 in the foregoing first implementation in that a first shaft sleeve part 41 is an elastic shaft sleeve. Specifically, an inner diameter $D_1$ of each first shaft sleeve part 4, an inner diameter $D_2$ of each second shaft sleeve part 5, and an inner diameter $D_3$ of a third shaft sleeve part 6 are equal. In other words, the first shaft sleeve 41 has an equal inner diameter.

It should be noted that other structures of the first shaft sleeve 41 of the first damping assembly 51 shown in this implementation are roughly the same as the related structure of the first shaft sleeve 41 of the first damping assembly 51 shown in the foregoing first implementation. Therefore, for other structures of the first shaft sleeve 41 shown in this implementation, refer to the related structure of the first shaft sleeve 41 shown in the foregoing first implementation. Details are not described herein again.

Figure 15A:
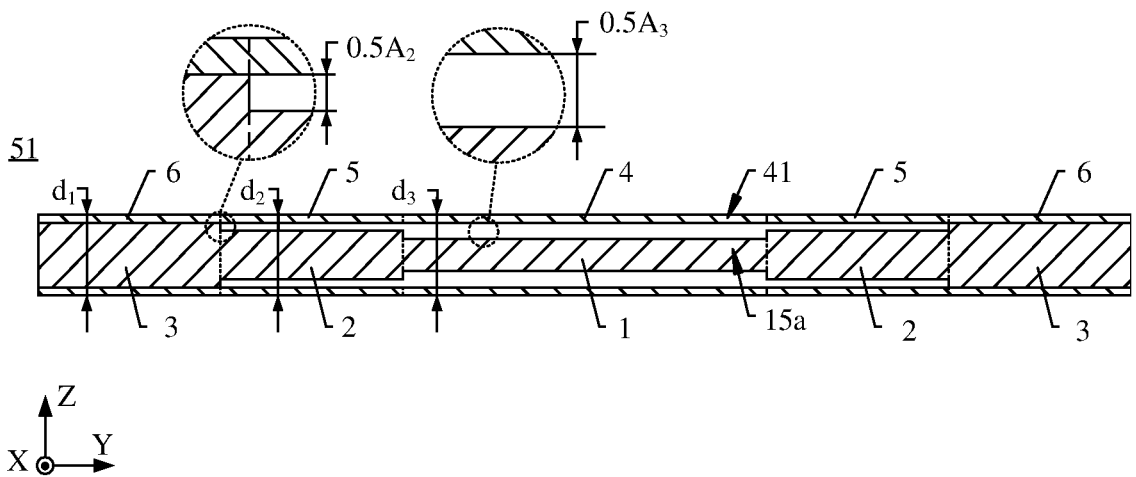
FIG. 15a is a schematic diagram of a cross-sectional structure of a first damping assembly in the rotating mechanism shown in FIG. 5 in a third implementation.
Figure 15B:
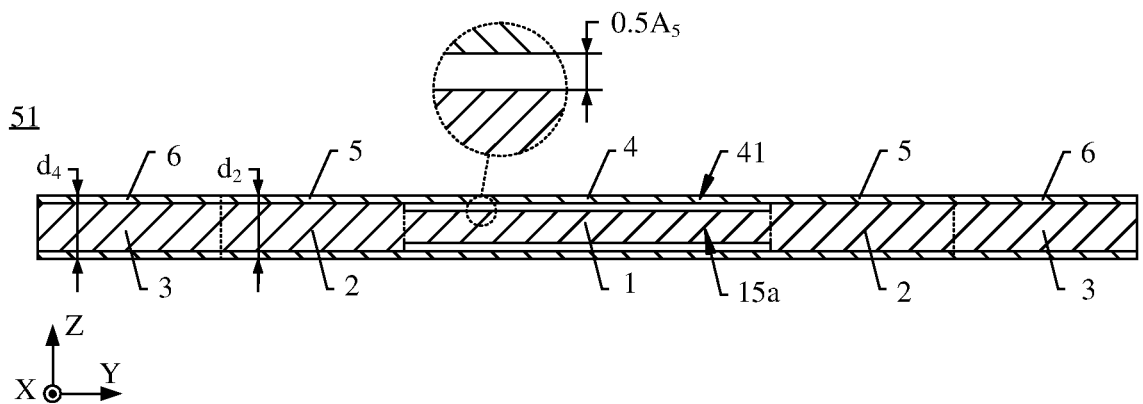
FIG. 15b is a schematic diagram of a cross-sectional structure of the first damping assembly shown in FIG. 15a after rotation relative to each other for $N_1$ times.
Figure 15C:
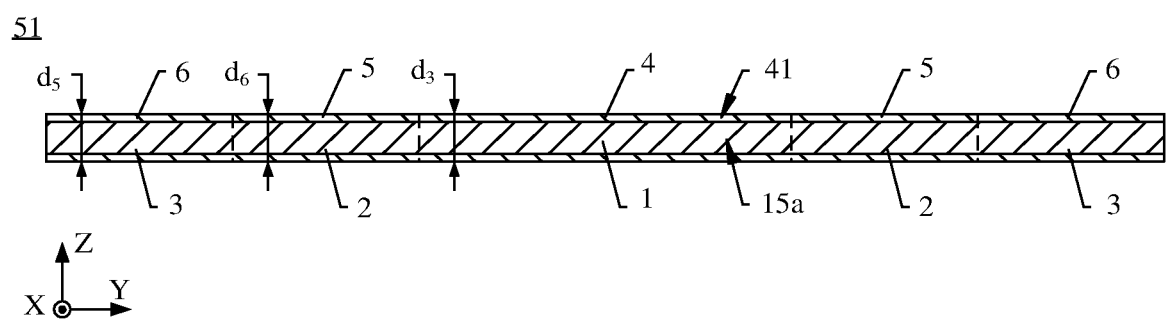
FIG. 15c is a schematic diagram of a cross-sectional structure of the first damping assembly shown in FIG. 15a after rotation relative to each other for $N_2$ times.

FIG. 15a is a schematic diagram of a cross-sectional structure of a first damping assembly 51 in the rotating mechanism 130 shown in FIG. 5 in a third implementation, FIG. 15b is a schematic diagram of a cross-sectional structure of the first damping assembly 51 shown in FIG. 15a after rotation relative to each other for $N_1$ times, and FIG. 15c is a schematic diagram of a cross-sectional structure of the first damping assembly 51 shown in FIG. 15a after rotation relative to each other for $N_2$ times.

A first shaft sleeve 41 is sleeved onto a first damping section 15a. Specifically, two first shaft sleeve parts 4 are sleeved onto two first damping parts 1 respectively, two second shaft sleeve parts 5 are sleeved onto two second damping parts 2 respectively, and a third shaft sleeve part 6 is sleeved onto a third damping part 3. The first shaft sleeve part 4 fits with the first damping part 1, an interference amount between the first shaft sleeve part 4 and the first damping part 1 is a first interference amount $A_1$, $A_1=d_1-D_1$, $d_1$ is equal to $D_1$, and $A_1$ is equal to 0. The second shaft sleeve part 5 is in clearance fit with the second damping part 2, an interference amount between the second shaft sleeve part 5 and the second damping part 2 is a second interference amount $A_2$, $A_2=d_2-D_2$, $d_2$ is less than $D_2$, and $A_2$ is less than $A_1$. The third shaft sleeve part 6 is in clearance fit with the third damping part 3, an interference amount between the third shaft sleeve part 6 and the third damping part 3 is a third interference amount $A_3$, $A_3=d_3-D_3$, $d_3$ is less than $D_3$, and $A_3$ is less than $A_2$.

In some other implementations, the first shaft sleeve part 4 may alternatively be in interference fit with the first damping part 1, or the second shaft sleeve part 5 may alternatively fit with or be in interference fit with the second damping part 2, or the third shaft sleeve part 6 fits with or is in interference fit with the third damping part 3, provided that it is ensured that the first interference amount $A_1$ is greater than the second interference amount $A_2$ and the second interference amount $A_2$ is greater than the third interference amount $A_3$.

A life cycle of the first damping assembly 51 shown in this implementation includes a first stage, a second stage, and a third stage. $N_1$ times is a demarcation point between the first stage and the second stage, and $N_2$ times is a demarcation point between the second stage and the third stage.

In the first stage, inner surfaces of the two first shaft sleeve parts 4 are attached to outer surfaces of the first damping parts 1 respectively, and a friction force generated between the first shaft sleeve parts 4 and the first damping parts 1 is used to provide a damping force. As the quantity of times of relative rotation between the first shaft sleeve 41 and the first damping section 15a constantly increases, the first damping parts 1 wear, and the diameters of the first damping parts 1 become smaller. However, due to elasticity of the first shaft sleeve 41, the inner diameter of the first shaft sleeve 41 becomes smaller to adapt to the first damping parts 1, so that the inner surfaces of the first shaft sleeve parts 4 are always attached to the outer surfaces of the first damping parts 1. After relative rotation between the first shaft sleeve 41 and the first damping section 15a for $N_1$ times, an outer diameter of the first damping part 1 becomes $d_4$, and $d_4$ is equal to $d_2$, as shown in FIG. 15b.

In the second stage, the inner surfaces of the two first shaft sleeve parts 4 are attached to the outer surfaces of the two first damping parts 1 respectively, the inner surfaces of the two second shaft sleeve parts 5 are attached to the outer surfaces of the two second damping parts 2 respectively, and the friction force generated between the two first shaft sleeve parts 4 and the two first damping parts 1 and the friction force generated between the two second shaft sleeve parts 5 and the two second damping parts 2 are used to provide a damping force. As the quantity of times of relative rotation between the first shaft sleeve 41 and the first damping section 15a constantly increases, the first damping parts 1 and the second damping parts 2 wear, and the diameters of the first damping parts 1 and the second damping parts 2 become smaller. However, due to elasticity of the first shaft sleeve 41, the inner diameter of the first shaft sleeve 41 becomes smaller to adapt to the first damping parts 1 and the second damping parts 2, so that the inner surfaces of the first shaft sleeve parts 4 are always attached to the outer surfaces of the first damping parts 1, and the inner surfaces of the second shaft sleeve parts 5 are always attached to the outer surfaces of the second damping parts 2. After relative rotation between the first shaft sleeve 41 and the first damping section 15a for $N_2$ times, the outer diameter of the first damping part 1 becomes $d_5$, the outer diameter of the second damping part 2 becomes $d_6$, and both $d_5$ and $d_6$ are equal to $d_3$, as shown in FIG. 15b.

In the third stage, the inner surfaces of the two first shaft sleeve parts 4 are attached to the outer surfaces of the two first damping parts 1 respectively, the inner surfaces of the two second shaft sleeve parts 5 are attached to the outer surfaces of the two second damping parts 2 respectively, the inner surface of the third shaft sleeve part 6 is attached to the outer surface of the third damping part 3, and the friction force generated between the two first shaft sleeve parts 4 and the two first damping parts 1, the friction force generated between the two second shaft sleeve parts 5 and the two second damping parts 2, and the friction force generated between the third shaft sleeve part 6 and the third damping part 3 are used to provide a damping force. As the quantity of times of relative rotation between the first shaft sleeve 41 and the first damping section 15a constantly increases, the first damping parts 1, the second damping parts 2, and the third damping part 3 wear, and the diameters of the first damping parts 1, the second damping parts 2, and the third damping part 3 become smaller. However, due to elasticity of the first shaft sleeve 41, the inner diameter of the first shaft sleeve 41 becomes smaller to adapt to the first damping parts 1 and the second damping parts 2, so that the inner surfaces of the first shaft sleeve parts 4 are attached to the outer surfaces of the first damping parts 1, the inner surfaces of the second shaft sleeve parts 5 are attached to the outer surfaces of the second damping parts 2, and the inner surface of the third shaft sleeve part 6 is attached to the outer surface of the third damping part 3. When the diameters of the first damping part 1, the second damping part 2, and the third damping part 3 are less than a minimum inner diameter value of the first shaft sleeve 41, the first damping assembly 51 finally fails.

It should be understood that, in the rotating mechanism 130 shown in this embodiment, the first damping assembly 51, the second damping assembly 52, the third damping assembly 53, and the fourth damping assembly 54 may have the same the structure, use one structure shown in the foregoing three implementations, or one or more structures shown in the foregoing three implementations, which is not specifically limited in this application.

The above are merely some embodiments of implementations of this application, and the protection scope of this application is not limited thereto. A person skilled in the art can easily conceive modifications or replacements within the technical scope disclosed in this application, and these modifications or replacements shall fall within the protection scope of this application. Therefore, the protection scope of this application shall be subject to the protection scope of the claims.

What is claimed is:

1. A damping assembly, comprising a damping section and a shaft sleeve sleeved onto the damping section, wherein the damping section comprises a first cylindrical damping part and a second cylindrical damping part that are arranged along a length direction of the damping section, the shaft sleeve comprises a first shaft sleeve part and a second shaft sleeve part that are arranged along a length direction of the shaft sleeve, the first shaft sleeve part are sleeved onto the first damping part forming a first interference fit therebetween, interference between the first shaft sleeve part and the first damping part is a first interference amount, the second shaft sleeve part is sleeved onto the second damping part forming a second interference fit therebetween, interference between the second shaft sleeve part and the second damping part is a second interference amount, and the second interference amount is less than the first interference amount, wherein the first interference amount is a difference between an outer diameter of the first damping part and an inner diameter of the first shaft sleeve part, and the second interference amount is a difference between an outer diameter of the second damping part and an inner diameter of the second shaft sleeve part.

2. The damping assembly according to claim 1, wherein the first interference amount and the second interference amount are both greater than zero.

3. The damping assembly according to claim 2, wherein the first damping part has an outer diameter greater than that of the second damping part, and the first shaft sleeve part has an inner diameter equal to or greater than an inner diameter of the second shaft sleeve part.

4. The damping assembly according to claim 3, wherein two first damping parts are provided, the two first damping parts are located on two opposite sides of the second damping part respectively, two first shaft sleeve parts are provided, and the two first shaft sleeve parts are located on two opposite sides of the second shaft sleeve part respectively.

5. The damping assembly according to claim 4, wherein two second damping parts are provided, and the two second damping parts are located between the two first damping parts; and two second shaft sleeve parts are provided, and the two second shaft sleeve parts are both located between the two first shaft sleeve parts.

6. The damping assembly according to claim 5, wherein the two first shaft sleeve parts each have a length equal to that of each of the two first damping parts, and the two second shaft sleeve parts each have a length equal to that of each of the two second damping parts; and a product of a sum of the lengths of the two first damping parts and the first interference amount is equal to a product of the second interference amount and a sum of the lengths of the two first damping parts and the lengths of the two second damping parts.

7. The damping assembly according to claim 5, wherein the damping section further comprises a third damping part, and the third damping part and the first damping parts are arranged in the length direction of the damping section; and the shaft sleeve further comprises a third shaft sleeve part, the third shaft sleeve part and the two first shaft sleeve parts are arranged in the length direction of the shaft sleeve, the third shaft sleeve part is sleeved onto the third damping part, an interference amount between the third shaft sleeve part and the third damping part is a third interference amount, and the third interference amount is less than the second interference amount.

8. The damping assembly according to claim 7, wherein the third damping part is connected between the two second damping parts, and the third shaft sleeve part is connected between the two second shaft sleeve parts.

9. The damping assembly according to claim 7, wherein the second damping parts each have an outer diameter greater than that of the third damping part, and the two second shaft sleeve parts each have an inner diameter equal to or greater than an inner diameter of the third shaft sleeve part.

10. The damping assembly according to claim 2, wherein the first damping part has an outer diameter equal to that of the second damping part, and the first shaft sleeve part has an inner diameter less than that of the second shaft sleeve part.

11. The damping assembly according to claim 10, wherein two second damping parts are provided, and the two second damping parts are located on two opposite sides of the first damping part respectively; and two second shaft sleeve parts are provided, and the two second shaft sleeve parts are located on two opposite sides of the first shaft sleeve part respectively.

12. The damping assembly according to claim 11, wherein the first shaft sleeve part has a length equal to that of the first damping part, and the two second shaft sleeve parts each have a length equal to that of each of the two second damping parts; and a product of the length of the first damping part and the first interference amount is equal to a product of the second interference amount and a sum of the length of the first damping part and the lengths of the two second damping parts.

13. The damping assembly according to claim 11, wherein the damping section further comprises a third damping part, and the third damping part and the first damping part are arranged along the length direction of the damping section; and the shaft sleeve comprises a third shaft sleeve part, the third shaft sleeve part and the first shaft sleeve parts are arranged along the length direction of the shaft sleeve, the third shaft sleeve part is sleeved onto the third damping part, an interference amount between the third shaft sleeve part and the third damping part is a third interference amount, and the third interference amount is less than the second interference amount.

14. The damping assembly according to claim 13, wherein two third damping parts are provided, the two third damping parts are located on two opposite sides of two second damping parts respectively, two third shaft sleeve parts are provided, and the two third shaft sleeve parts are located on two opposite sides of the two second shaft sleeve parts respectively.

15. The damping assembly according to claim 14, wherein the second damping parts each have an outer diameter equal to that of each of the two third damping parts, and the two second shaft sleeve parts each have an inner diameter less than that of each of the two third shaft sleeve parts.

16. A rotating mechanism, comprising two damping assemblies according to claim 1, wherein the two damping assemblies are a first damping assembly and a second damping assembly, and a damping section of the first damping assembly and a damping section of the second damping assembly are arranged side by side and spaced apart from each other along a direction perpendicular to the damping section of the first damping assembly.

17. The rotating mechanism according to claim 16, wherein the rotating mechanism comprises a first rotating shaft, a second rotating shaft, first swing arms, and second swing arms, wherein the first rotating shaft comprises the damping section of the first damping assembly, and the second rotating shaft comprises the damping section of the second damping assembly; the first swing arms are sleeved onto the first rotating shaft, and are spaced apart from the shaft sleeve of the first damping assembly along a length direction of the first rotating shaft; and the second swing arms are sleeved onto the second rotating shaft, and are spaced apart from the shaft sleeve of the second damping assembly along a length direction of the second rotating shaft; and a direction in which each first swing arm rotates relative to the first rotating shaft is opposite to a direction in which each second swing arm rotates relative to the second rotating shaft.

18. The rotating mechanism according to claim 17, wherein two first swing arms are provided, the two first swing arms are sleeved onto the first rotating shaft, and are spaced apart from each other in the length direction of the first rotating shaft; and two second swing arms are provided, the two second swing arms are sleeved onto the second rotating shaft, and are spaced apart from each other in the length direction of the second rotating shaft.

19. The rotating mechanism according to claim 17, wherein the rotating mechanism further comprises a transmission member, and the transmission member is connected between the first rotating shaft and the second rotating shaft.

20. A foldable terminal, comprising a first housing, a second housing, and the rotating mechanism according to claim 16, wherein the first housing is fixedly connected to the shaft sleeve of the first damping assembly, and the second housing is fixedly connected to the shaft sleeve of the second damping assembly.

* * * * *

UNITED STATES PATENT AND TRADEMARK OFFICE
CERTIFICATE OF CORRECTION

| | | |
|---|---|---|
| PATENT NO. | : 12,359,485 B2 | Page 1 of 1 |
| APPLICATION NO. | : 18/246778 | |
| DATED | : July 15, 2025 | |
| INVENTOR(S) | : Yameng Wei | |

It is certified that error appears in the above-identified patent and that said Letters Patent is hereby corrected as shown below:

On the Title Page

Item (71) Change "(71) Applicant: HONOR DEVICE CO., LTD., Guangdong (CN)" to "(71) Applicant: HONOR DEVICE CO., LTD., Shenzhen (CN)".

Signed and Sealed this
Twelfth Day of August, 2025

Coke Morgan Stewart
*Acting Director of the United States Patent and Trademark Office*